(12) United States Patent
Sama et al.

(10) Patent No.: US 7,386,276 B2
(45) Date of Patent: Jun. 10, 2008

(54) WIRELESS INFORMATION RETRIEVAL AND CONTENT DISSEMINATION SYSTEM AND METHOD

(76) Inventors: Robert J. Sama, 51 Warren St., #2-1, Waltham, MA (US) 02453; Christopher M. LaPre, 51 Warren St., #2-1, Waltham, MA (US) 02453

( * ) Notice: Subject to any disclaimer, the term of this patent is extended or adjusted under 35 U.S.C. 154(b) by 889 days.

(21) Appl. No.: 10/650,501

(22) Filed: Aug. 27, 2003

(65) Prior Publication Data
US 2004/0077367 A1 Apr. 22, 2004

Related U.S. Application Data

(60) Provisional application No. 60/406,216, filed on Aug. 27, 2002.

(51) Int. Cl.
*H04B 7/00* (2006.01)
(52) U.S. Cl. .................. 455/41.3; 455/41.2; 455/41.3; 340/10.1; 340/10.5; 340/10.42
(58) Field of Classification Search ............... 455/41.2, 455/456.1, 41.3, 566; 340/10.1, 10.5, 10.42, 340/825.49, 825.36; 705/16–18
See application file for complete search history.

(56) References Cited

U.S. PATENT DOCUMENTS

| | | | |
|---|---|---|---|
| 4,654,793 A | | 3/1987 | Elrod |
| 4,906,853 A | * | 3/1990 | Linwood et al. ............ 250/551 |
| 5,455,851 A | * | 10/1995 | Chaco et al. ................ 379/38 |
| 5,465,082 A | * | 11/1995 | Chaco ................... 340/825.49 |
| 5,910,989 A | * | 6/1999 | Naccache ................... 713/173 |
| 5,936,542 A | | 8/1999 | Kleinrock et al. |
| 6,154,139 A | * | 11/2000 | Heller ..................... 340/573.4 |
| RE37,531 E | * | 1/2002 | Chaco et al. ................. 379/38 |
| 6,347,301 B1 | | 2/2002 | Bearden, III et al. |
| 6,452,980 B1 | * | 9/2002 | Zalud et al. ................ 375/285 |
| 6,539,393 B1 | * | 3/2003 | Kabala ...................... 707/102 |
| 6,600,899 B1 | | 7/2003 | Radomsky et al. |
| 6,615,179 B1 | | 9/2003 | McNicol et al. |
| 6,972,683 B2 | * | 12/2005 | Lestienne et al. ......... 340/572.1 |
| 7,099,895 B2 | * | 8/2006 | Dempsey ................... 707/102 |

(Continued)

OTHER PUBLICATIONS

Yasusuki Sumi and Kenji Mase, "Conference Assistant System . . . ," www.art.co.jp/mis, Accepted Mar. 15, 2002, Kyoto, Japan.

(Continued)

*Primary Examiner*—Lana Le
*Assistant Examiner*—April S. Guzman
(74) *Attorney, Agent, or Firm*—O'Connell Law Firm

(57) ABSTRACT

A method for the wireless information retrieval regarding bodies, such as persons, animals, and objects, and for disseminating content based on retrieved information comprising providing a plurality of wireless communication sending units, each for being retained by a body about whom information is to be retrieved; providing a plurality of wireless communication receiving units, each for being retained by a person who is to receive information; providing a central server; providing a wireless access point; establishing a wireless local area network involving the foregoing elements; causing periodic identifying signals to be emitted from the sending units; and transmitting information to a given receiving unit regarding a body retaining a sending unit in response to a receipt of a signal from that body's sending unit.

87 Claims, 8 Drawing Sheets

U.S. PATENT DOCUMENTS

2002/0115449 A1   8/2002   Allen
2003/0191767 A1   10/2003   Kabala
2004/0183682 A1*   9/2004   Tenarvitz .................. 340/573.1

OTHER PUBLICATIONS

Shockfish SA, "spotmeinfo.html," www.spotme.ch/spotmeinfo.html, (c) 2003, Lausanne, Switzerland.

NTAG Interactive, LLC, "nTAG People Networking," www.ntag.com, (c) 2003, New York, NY USA.

NCSA, "IntelliBadge," www.intellibadge.ncsa.uiuc.edu/Date unknown, Champaign, Illinois USA.

Charmed Technology, "Your SmartBadge is the Charm-Badge," www.charmed.com/products.php, Date unknown, Santa Monica, CA USA.

Borovoy et al., "Meme Tags and Community Mirrors: Moving from Conference to Collaboration," 1998, Proceedings of the 1998 ACM Confernce, Cambridge, MA USA.

MIT Media Lab, "MIThril," www.media.mit.edu/wearables/mithril/index.html, Date unknown, Cambridge, MA.

Hewlett-Packard, "Cooltown," www.cooltown.hp.com/cooltownhome/index.asp, Date unknown, Palo Alto, CA.

* cited by examiner

```
:020000040000FA
:020000005A0A9A
:080008000108FF08FF08FF08D2
:10001000FF0863006400C80C0200040C2600C80C32
:100020000600040000087A000409BA010509BA01B3
:100030000609BA010709BA010809BA010008000C4B
:100040003800F803210A0008090C3C0003040400EE
:100050000307310A2B0A2C0A2D0A2E0A2F0A000048
:100060004D0A1507360A3506470A3E0A3507390A8A
:10007000430A0000060500000604 4D0A000026059C
:100080000000026044D0A8605000086044D0A000083
:100090000000A6050000A6044D0A7E0C3800FF0CE7
:1000A0003900F803510AF903510AFC02580A000802
:1000B0003B03270A09090400270C97000307620A7B
:1000C0004604630A4605F7020300030C7501430664
:1000D000130904093B0024091F09000005093B001E
:1000E00024091F0906093B0024091F0907093B00D1
:1000F00024091F0908093B0024091F0913091A02D2
:100100003B002409B502060C5506280C37000400F4
:08011000 4605030000005A0A35
:00000001FF
```

WIRELESS INFORMATION RETRIEVAL AND CONTENT DISSEMINATION SYSTEM AND METHOD

FIELD OF THE INVENTION

The present invention relates generally to systems and methods for accumulating, managing, and disseminating information. More particularly, disclosed and protected by the present patent are systems and methods for enabling the wireless retrieval of information, such as leads, regarding mobile articles or persons, such as attendees at trade shows and conferences, and the dissemination of content based on the acquired information.

BACKGROUND OF THE INVENTION

Over 4,500 trade shows are held in North America each year. These shows are predominantly business-to-business or B-2-B wherein businesses seek to display and sell their products to other businesses. A number of methods are employed to enable exhibitors to collect leads at these trade shows. The simplest and perhaps oldest method is commonly referred to as the fishbowl wherein attendees are encouraged to drop their business cards into a fishbowl or the like, and the deposited cards are retrieved and processed by the exhibitors or trade show organizers.

More modern methods include the use of a magnetic card stripes and bar code readers. One bar code arrangement is disclosed in U.S. Pat. No. 4,654,793 to Elrod, entitled "System and method for registering and keeping track of the activities of attendees at a trade show, convention or the like." Under a typical method, each attendee is given a badge at his or her arrival at the trade show registration desk. The badge will normally have the attendee's name printed thereon and either a barcode or a magnetic stripe similar to that of a credit card. The magnetic stripe or barcode provides the attendee's basic contact information, which commonly includes his or her name, address, phone, and company or, alternatively, a number that correlates to that information, which is retained in a separate database.

The exhibitors are outfitted with readers, which are normally rented. Depending on the particular method employed, exhibitors must scan the bar code or swipe the magnetic stripe to gain the attendee's basic contact information. The scanner, which is a non-networked, standalone unit, then prints on paper the basic contact information scanned from the card or bar code. The paper is often carbon copied, allowing for two or more simultaneous copies to be made. Some readers have the ability to upload the stored names to a floppy disk in comma delimited ASCII format after the show.

Unfortunately, these prior art systems have not been updated in substance since the advent of two-dimensional bar codes in the early 1990's. As a result, they present several problems and disadvantages. One basic problem that plagues all three existing systems, the fishbowl, the magnetic stripe, and the barcode, is that each requires intrusively asking the attendee for a card or grabbing the attendee's badge. By surveying trade show exhibitors, the present inventors have determined that exhibitors are very uncomfortable asking for stranger's business cards or grabbing someone's magnetic stripe badge or shooting a laser beam at a card hanging on an attendee's chest. This problem becomes exasperated when a male exhibitor needs to scan the badge of a female attendee. The present inventors have appreciated, therefore, that a passive system would be preferred that could record the meeting without requiring the exhibitor to be intrusive and aggressive, particularly upon first meeting an attendee.

A further problem demonstrated by the methods of the prior art is a lack of mobility in that the exhibitor must normally drag attendees across the trade show booth to scan or swipe their badges. Such a practice is counter-intuitive to the typical sales process where a salesperson normally spends time chatting and displaying products before asking for contact information. Also, it requires the salesperson to place a further burden on the customer by asking the customer to follow him or her across the booth for the scanning or swiping.

Some have sought to address this problem by attaching barcode scanners to PDAs so that exhibitors can avoid dragging attendees across the trade show booth. However, doing so creates new problems while failing to eliminate the intrusiveness of shooting a laser beam at an attendee's chest or swiping the attendee's badge. Also, the PDAs in such systems are not networked and do not print out the retrieved information as it is gathered. As a result, there is no backup of the data collected, and, should the PDA lose power or otherwise malfunction, data collected during the day can be lost forever. Indeed, some companies offering this type of service have been forced to terminate it as a result of data loss. Even further, some companies have added bar code scanners and printers to PDAs and PDA-like devices, but these devices have proven to be large and unwieldy such that they have not found widespread acceptance in the trade show world.

A newer method involves connecting a bar code scanner or metallic stripe reader to a PC, whether a laptop or desktop, and savings the data collected directly to the PC. Several PC's may be networked within a booth under such a system. While such systems provide improvements over dedicated systems, they ultimately return only what amounts to a list of names. As a result, they rely on the exhibitor to question the attendee about his or her interests and the like. Further, such systems typically still return information only in comma delimited ASCII text and do not integrate and manipulate the acquired data. As a result, the exhibitor must carry out such tasks on its own or by use of additional consulting services.

Still another problem demonstrated by existing lead retrieval systems is that, after a trade show, the exhibitor is forced to remember people by name. The exhibitor receives a list of names after the show with little other data to help remember which people were key leads and which were not. While some systems allow exhibitors to take notes on the people they met and some allow exhibitors to press a series of buttons to categorize the people they meet, such as with a 1-to-5 rating system, such a practice is still far less than optimal and does not correlate with the way the human brain works. People remember faces better than names, and no lead acquisition system today enables exhibitors after the show to see whom they met.

Finally, while some systems network various lead retrieval devices within a trade show booth, no known system to date networks systems between trade show booths. As a result, exhibitors have no way of knowing how they did in comparison to other exhibitors at the show or compared to the show at large. As a result, exhibitors are left to guess at their relative success at any given show they attend.

By way of further background, one will note that the use of infrared (IR) light to transmit information has been employed for some time in a variety of devices, from remote controls for televisions and stereo appliances to its use in PDAs to exchange business card and other information. Furthermore, experimentation using infrared beacons to designate locations has been employed by the MIT Media Lab and HP Cooltown, both of which have disclosed their experiments publicly including through the Internet.

The MIT Media Lab has also engaged in limited experiments using IR tags to designate people. In those experiments, each person is outfitted with a wearable computer. Each wearable computer detects other wearable computers IR tags and then looks up on a wireless network any information associated with the tag and displays that information relative to an eyepiece. However, there are certain problems that are created using this method, which MIT has left unsolved.

The Media Lab's experiments have been conducted with small groups of people, not with the size and scale of crowds that attend a trade show. In a crowd, IR beacons have the potential to interfere with one another. If, for simplicity's sake, one assumes the IR beacon blinks once per second on the tenth of a second, then more than ten people in a room together will result in at least two people blinking simultaneously and, therefore, in synch. This synchronicity causes confusion for the device trying to read the tags because the computer cannot distinguish between what each tag is broadcasting separately.

Furthermore, MIT has used IR tags on physical objects as a means for identifying them to a wearable computer. HP Cooltown has done the same relative to PDAs. Both of these models, however, are dependent on each person having a wearable computer or PDA for the system to work. A person wearing an IR tag but without a wearable computer or PDA cannot be identified as having been in a particular location under the MIT and HP systems. In this regard, it will be appreciated that the cost of outfitting each attendee at a trade show with a wearable computer or PDA would be prohibitive and, therefore, not an economically viable option.

The MIT Media lab has done other experiments with what they refer to as "Meme Tags" and "GroupWear Tags" GroupWear Tags represent an earlier attempt at creating an intelligent nametag wherein users were asked 5 questions upon registering for a conference. Users would then be given a nametag that contained 5 red and 5 green LEDs and an IR receiver/transmitter. Upon meeting someone at a conference, the tag would communicate with the other person's tag and determine how many questions they answered in common. If, for example, they had 3 questions in common, the tag would light 3 green LEDs and 2 red LEDs.

One will appreciate that the relatively primitive means of predictive scoring provided by GroupWear Tags is limited by the number of lights that could fit on a nametag. Furthermore, it represents only the degree to which two persons have interests in common. It is incapable of determining to what extent each person is interested in meeting the other. For example, if an attendee is interested in meeting an exhibitor for the purposes of securing employment, but the exhibitor is not hiring, the GroupWear tag only gives both a rudimentary indication that they are a bad fit for each other. It does not notify an exhibitor a-priori that this person is someone to be avoided. By publicly and openly saying "no" to the attendee, the GroupWear Tag denies the attendee the opportunity to make his or her case despite the bad rating.

The Meme Tag is a bit more complex and is more suited for conferences than for trade shows. Each Meme Tag is outfitted with an LCD display, which shows a bit of information, commonly referred to as a meme. Upon meeting other attendees, each attendee has the opportunity to press a red button or a green button to accept or decline the other attendee's meme. Periodically, attendees may upload their collected memes at kiosks via an IR port on the Meme Tag. The Meme Tag records which memes the attendee collected from whom and when the meme was collected. The Meme Tag system then creates reports and maps of who met whom at the conference event. Charmed Technologies has a similar product, referred to as the CharmBadge, which also enables collecting the names of people met at conferences. In January of 2003, another company, nTag, emerged with similar technology based on the same research.

It has been found that there are a number of problems with each of the GroupWear Tag, the Meme Tag, and the CharmBadge. For example, each arrangement is what can be termed attendee-centric in that functionality is imparted to the badge that is costly and that does not serve the needs of the group that actually pays for the show, the exhibitors. Further, each of these devices operates in an overt way allowing the other party in a conversation or meeting to see what one is doing by pressing red and green buttons on a tag or by overtly displaying to the other party whether they should be meeting. This can be embarrassing to attendees who have their memes rejected, especially if those memes are business cards, and uncomfortable to the attendee actually doing the rejecting. Additionally, except for the nTag design, which was launched after the filing date of the present application and which appears to be networked wirelessly, none of these systems are networked except when docked or in front of a designated IR kiosk. Therefore, none of these systems can provide real-time information about the status on the show floor.

Even further, the knowledgeable observer will be aware that no known prior art system enables one to recreate a trade show after it is completed or to view what happened overall at a given trade show after it is over. These disadvantages derive from, among other things, the facts that the data collected is largely incomplete and is not collected and analyzed in one central database.

For these and further reasons, it is clear that there is a cognizable need for an improved system and method for retrieving information regarding mobile articles and persons, such as information relative to the characteristics and activities of trade show attendees and exhibitors, and for disseminating content based thereon.

SUMMARY

Advantageously, the present invention is founded on the most basic object of providing an improved system and method for acquiring information regarding mobile articles or persons.

Certain embodiments of the invention have the further object of analyzing acquired information and disseminating content based thereon.

Particular embodiments of the invention have the object of acquiring information, such as lead information, regarding attendees and others at a gathering or location, such as at a trade show or conference, and disseminating content regarding the attendees, such as to exhibitors, attendees, organizers, and others based thereon.

A further object of manifestations of the invention is to replace prior art information acquisition systems requiring active participation from attendees and others with a system that acquires information automatically based on a movement of mobile articles or persons, such as based on an attendee's movements and activities at a trade show, conference, or other gathering or location.

Another object of embodiments of the invention is to correlate acquired information in a seamless and real-time format and to aggregate the acquired information into immediately useful reports and statistics.

In certain embodiments, the invention has the further object of providing exhibitors with a predictive score regarding each attendee they meet, such as by correlating by intelligent algorithms the interests of the attendee as stated at registration with predetermined goals of the exhibitor thereby enabling the exhibitor to spend more time with the good prospects and less time with the lousy prospects in a manner that is not embarrassing to either party.

Still another object of embodiments of the invention is to associate visual identifying information, such as a digital photo, with mobile articles or persons to enable a ready association of the mobile article or person with further information, such as business card and other data, regarding the mobile article or person.

A still further object of certain manifestations of the invention is to deliver real-time and post-show reporting on the activities of employees sent to attend trade shows and of employees sent to man trade show booths.

An additional object of particular embodiments of the invention is to enable exhibitors to capture leads anywhere they go on the show floor, even outside the exhibitor's own booth.

An even further object of embodiments of the invention is to enable exhibitors to send requested email literature to attendees they meet immediately and in real time no matter where they meet on the trade show floor.

Still another object of manifestations of the invention is to provide an integrated nametag for attendees that incorporates the traditional printed nametag in a plastic sheath while attaching thereto a beacon, such as an IR beacon by means of a plastic casing that is attractive and sleek.

Certain embodiments of the invention have the object of aiding show operators in preventing the switching or stealing of badges and the often resultant unauthorized entry into events.

An additional object of embodiments of the invention is to enable an exhibitor to record the answers to customized questions asked of each attendee securely and easily.

Another object of embodiments of the invention is to alert exhibitors when an important attendee has just stepped in or near their trade show booth and, possibly, to provide a photo of the attendee to assist the exhibitor in finding and greeting the attendee. An even further object of embodiments of the invention is to enable exhibitors to track attendees by particular attributes of the attendee, such as type of company, type of job, individual interests, or any other requested attribute.

A more particular object of embodiments of the invention is to enable exhibitors to compare their performance at one show with their performances at other shows, the same show in previous years, and at different shows in various years thereby helping exhibitors determine which shows to attend in the future. A related object is to produce a viral marketing effect under which exhibitors are motivated to attend shows that are enabled with the present invention so that they make such comparisons of data from and between shows. An additional related object of the invention is to enable exhibitors to measure their effectiveness at the show as compared to the show at large and as compared to specific competitors.

Another object of certain embodiments of the invention is to protect attendees from unwanted spam and unsolicited email that might otherwise be sent by unscrupulous exhibitors and others.

An additional object of manifestations of the invention is to provide a means by which exhibitors can readily schedule time with attendees and be provided with reminders of those appointments.

A further particular object of embodiments of the invention is to enable a tracking of mobile articles or persons, such as attendees and exhibitors as they move about the trade show floor, and to record their movements and to disseminate the acquired information, such as to generate reports and leads for trade show exhibitors.

These, and in all likelihood further, objects and advantages of the present invention will become obvious not only to one who reviews the present specification and drawings but also to those who have an opportunity to make use of an embodiment of the wireless information retrieval and content dissemination systems and methods disclosed herein. However, it will be appreciated that, while the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth the objects described above, an embodiment of the present method for the wireless retrieval of information regarding mobile bodies and for disseminating content based on retrieved information can be founded on the steps of providing a wireless communication sending unit for being retained relative to at least a first mobile body wherein the wireless communication sending unit comprises a means for emitting a signal, which can be periodic, providing a wireless communication receiving unit for being retained relative to at least a second mobile body wherein the wireless communication sending unit comprises a means for receiving the signal emitted by the wireless communication sending unit, providing a central server for retaining information, providing a wireless access point, and establishing a wireless local area network involving the wireless communication sending unit, the wireless communication receiving unit, the central server, and the wireless access point. Of course, it will be noted that, in most practices of the invention, there will be a plurality of wireless communication sending units retained relative to different bodies, a plurality of wireless communication receiving units also retained relative to different bodies, and, possibly, a plurality of wireless access points and central servers. It will be further noted that the term mobile body in the context of the present discussion shall be deemed to include not only persons but also any other beings, goods, things, and articles of merchandise. Even further still, it should be borne in mind that, depending on their functions, it is well within the scope of the present invention for wireless communication sending units to act also as wireless communication receiving units and vice-versa.

The method would likely further include causing periodic signals to be emitted from the wireless communication sending units and having those signals be received by the wireless communication receiving units when the two are within a given proximity. Such a receipt of signals advantageously enables a determination of whether the sending and receiving units are within the given proximity to one another. Normally, an identifying association will be made, such as by the operators of an event, between the sending unit and the first mobile body. The central server can retain information regarding the first mobile body and information regarding the first mobile body can be automatically transmitted to the receiving unit in response to a receipt of a signal from the sending unit.

The wireless local area network can be of any appropriate type and can operate under any wireless communication protocol, such as the Wireless Fidelity (Wi-Fi) network architecture. The wireless communication receiving units can comprise infrared-enabled Personal Digital Assistants (PDAs) with display screens for displaying transmitted information. The central server can retain a history of, for example, signals received by the receiving units from the sending units and of information transmitted to the receiving units from the central server.

The method and system can further include a means for preventing cross talk between wireless communication sending units. In one embodiment, that means can comprise a means for individually varying the wait time for each wireless communication sending unit. Where the periodic signals are transmissions of identification numbers for the wireless communication sending units, the means for selectively varying the wait time can be a means for generating a random wait time based on a mathematical calculation involving the identification number. The identification numbers can each be formed by a plurality of bytes and the mathematical equation can rely on a successive multiplication of the bytes. Each wait time can be within a range of legal wait times with a minimum wait time and a maximum wait time separated by a number of units, and the mathematical equation can comprise a multiplying of successive bytes of each identification number and determining a modulo 256 of that number until all bytes are used to produce a product, then dividing the product by 256 to produce a result and multiplying the result by the number of units in the range of legal wait times, and then adding the minimum wait time thereto to produce the wait time. Each periodic signal can actually comprise an emitting of the identification number a plurality of times with each emitting of the identification number separated by a between-number wait time and with each periodic signal separated by a between-signal wait time. In one manifestation of the invention, each sending unit can have a plurality of infrared LEDs and each periodic signal can comprise an emitting of the identification number by each of the plurality of LEDs in succession.

In any event, an automatic transmitting of information can be carried out in response to a receipt by the receiving unit of an identifying signal from the sending unit by looking up the identifying signal in a database retained on the central server and transmitting information regarding the first mobile body, such as an attendee at a trade show, from the central server to the receiving unit. The receiving unit, such as an exhibitor's PDA at a trade show, can provide a means, such as a button or a name to be clicked, for enabling a request for additional information regarding the first mobile body, which can be an attendee, from the central server. Indeed, the user of the receiving unit could request additional information in the form of an image of the first mobile body.

In certain cases, the system and method can initiate an automatic request for additional information regarding the first mobile body based on a predetermined condition. For example, where the receiving unit receives periodic signals from a given sending unit for a continuous predetermined time, it may be assumed that further information is desired. Similarly, a desire or need for additional information could reasonably be presumed when the sending and receiving units come into a predetermined approximate range. One means for enabling such an automatic request for additional information could be to have a sending unit that emits a first periodic signal over a first distance range and a second periodic signal over a second distance range wherein the second distance range is smaller than the first distance range. With that, when a receiving unit receives the second periodic signal, one can assume that the units are close and further information would be worthwhile.

Particular embodiments of the invention can additionally provide one or more stationary wireless communication receiving units for being disposed in stationary location and for receiving signals from sending units that are in sufficient proximity. Advantageously, when a stationary receiving unit receives a signal from a sending unit, one can approximate the location of the sending unit. Also, bearing in mind that PDAs turn themselves off at regular intervals, embodiments of the system can have continuously operable wireless communication receiving means disparate from the wireless communication receiving units to ensure a continuous receipt of signals from the wireless communication sending units. Still further, a triangulation server can be provided that can query the wireless access points as to a relative signal strength of the wireless communication sending units thereby to enable an estimate of the location of the wireless communication sending units. Such a practice can be facilitated by a comparison of actual signal strengths for sending units in unknown locations to signal strengths for sending units in known locations.

Certain systems can further include a means for enabling an ignoring by the receiving unit of signals received from a selected sending unit, such as an exhibitor's own sending unit or those of his or her coworkers. Even further, particular embodiments of the system and method can enable a user to cause an alert to be made on his or her receiving unit when it receives a signal from a selected sending unit, such as that of a hot prospect. Also, systems under the invention can enable a user of a receiving unit to record relative to a central server, which can be secure and, additionally or alternatively, Internet-based, and review information relative to a body retaining a sending unit. Furthermore, systems according to the invention can have a means for providing a scoring of levels of correlation between parameters established by a person retaining a receiving unit and characteristics of a person or thing retaining a sending unit. Additionally, embodiments of the invention can enable varied levels of access to information based on user-specific authorizations, which can be allotted based on a pay-to-view basis or based on any other grounds.

It will be appreciated, therefore, that particular embodiments of the invention, which will be further described below, represent a new kind of lead retrieval and content dissemination system designed for trade shows and conferences. The system represents the first lead retrieval and management system that networks collection devices not only across a particular booth, but also across the entire show itself, and indeed can combine data from different years and from entirely different events. The invention uses infrared beacons or RFID tags as nametag identifiers, and outfits exhibitors with wireless enabled PDAs. Exhibitors use their wireless enabled PDAs to access and record information about the persons they meet at trade shows, and to discretely receive predictive scoring about how likely each person they meet is to be a good lead.

As attendees come to the trade show for registration, all of their relevant personal information is entered into a central database. Included in this information is the standard business card information, as well as any particular demographic questions or survey questions about attendee interests requested by exhibitors prior to the show. Attendees then have their photo taken digitally by means of a web cam, which relays the photo to the central database for association with other attendee information in the database and for later retrieval. Registration staff then prints a name badge and grabs an IR or RFID tag from a bin. These tags are pre-programmed, and the registration staff member uses a PDA to read the number being emitted by the tag and correlates it with the name on the tag in the central database. The IR or RFID tag is then attached to the printed badge and handed to the attendee to be worn throughout the show.

Exhibitors have wireless enabled PDAs and bring them to the trade show. Upon registration, they undergo a similar process as the attendees except that they hand their PDA to the registration staff to have the invention software loaded onto their PDA and to assign the PDA a number that will also be associated with the particular exhibitor, his own IR or RIFD tag number and the company he represents.

The invention software placed on the PDA commandeers the IR port on the PDA, and scans continuously for the signals of the IR beacons. In the RFID version, the invention software uses the wireless functionality of the PDA to the same effect. Upon seeing a number emitted by the nametag, the software requests the related information from the central database (unique intranet) while simultaneously telling the central database its own id number, which tag number it saw, and what time it is. In one version of the invention, an access point based location determination system that uses triangulation or some variant thereof is used, and this information is also recorded in the central database. In another version of the invention, IR or RFID tags are placed on the walls of booths, and these tags when seen in conjunction with nametags indicate location. The server, upon receiving the request, serves up the requested business card information, as well as a photo and any custom forms which that exhibitor may have paid to have on business cards he sees.

Via the PDA, the exhibitor can also enter notes about each person they meet, and can fill out ratings forms, customized to each exhibitor's needs. These notes and form responses are then sent wirelessly to and stored on the central database for later retrieval and use. During and after the show, the exhibitor can view reports about who went to their booth and when, sorted by any field desired, by any time of day, by any day of the show. Exhibitors can "follow" a particular attendee around the show floor and see where they went and when. Exhibitors can see reports comparing their booth's performance to competitors booths at a given show, to the show at large, to their own performance at other shows enabled with the invention, both prior year's show and other shows held in the same or different years.

Prior to the show, the exhibitor specifies which forms he wants to be able to fill out on attendees, and provides literature that he would like to be able to email to attendees he meets on the fly. Then, upon meeting an attendee, the exhibitor can ascertain which literature the attendee would be interested in receiving, and at the touch of a button the literature is automatically sent directly to the attendee.

In congested areas, sometimes a nametag broadcast of its ID number may overlap the broadcast of another nametag. Worse yet, two nametags can be completely in sync, confusing the PDA, which would then not be able to record anything. To resolve this problem, the nametags, after each transmission cycle, would pause by a random amount of time. As a result, this unique feature will significantly reduce the chance of overlap for more than one broadcast cycle.

Often times, attendees are concerned about having unsolicited email, or spam, sent to them by exhibitors. To overcome this, the system provides a mock email address to each attendee, in the form of a number, e.g. 1234@closer-.com. Exhibitors may receive the numbered email address for each attendee they meet, and any email sent will be automatically forwarded to the legitimate address. If an exhibitor tries to spam an attendee, the attendee may simply kill the numbered email address, after letting legitimate exhibitors know their real email address.

The invention also employs wall receivers, which detect IR or RFID signals, and simply report them back into the central database throughout the day. This data is then used as an additional means of increasing the accuracy of the passive lead acquisition system, enabling the system at large and thus the exhibitor to know when a person enters or has entered a booth, even if they went unobserved by a live person.

The system also conducts predictive scoring, which can determine how likely an exhibitor would be interested in talking to a particular attendee. The system can display this in any appropriate manner, such as by a percentage, an A through F rating, or any other method, and can further interrupt the exhibitor when a particularly important person was detected by a wall receiver in the exhibitor's vicinity. This feature further helps the exhibitor to manage their time while facing thousands of strangers Marching through a trade show booth in a day.

The invention also provides real-time or near real-time information to supervisors or employers who do not attend trade shows themselves, but send their employees to trade shows. Employers can remotely monitor the progress of their employees at trade shows, and see whom their employees have met with and thereby ensure that their money is well spent and that their employees are doing what they are supposed to be doing at the trade show.

Finally, information gathered by the system may be retrieved from anywhere by using an Internet enabled computer to access the system's server located at in ISP NOC. Further, all leads acquired are delivered in standard electronic business card format, for easy integration into Microsoft Outlook or other popular PIM program.

One will appreciate that the foregoing discussion broadly outlines the more important features of the invention to enable a better understanding of the detailed description that follows and to instill a better appreciation of the inventors' contribution to the art. Before any particular embodiment or aspect thereof is explained in detail, it must be made clear that the following details of construction, descriptions of hardware and software designs, and illustrations of inventive concepts are mere examples of the many possible manifestations of the invention.

DETAILED DESCRIPTION OF PREFERRED EMBODIMENTS

As is the case with many inventions, the present invention for a wireless information retrieval and content dissemination system and method is subject to a wide variety of embodiments. However, to assure that one skilled in the art will be able to understand and, in appropriate cases, practice the present invention, certain preferred embodiments and aspects of preferred embodiments of the broader invention revealed herein are described below and shown in accompanying figures.

Figure 1:
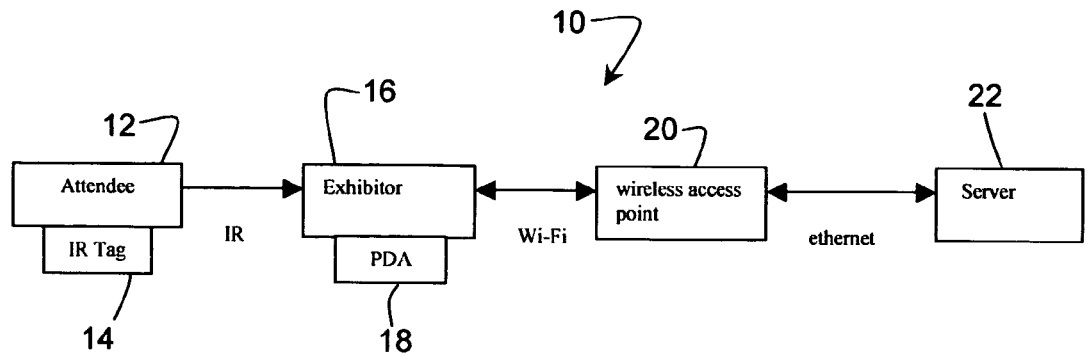
FIG. 1 is a simplified diagram of a system according to the present invention for wireless information retrieval and content dissemination.

Turning more particularly to the drawings, a system according to the present invention for wireless information retrieval and content dissemination is indicated generally at 10 in FIG. 1. Although the system 10 for wireless information retrieval and content dissemination is often shown and described herein in relation to a system and method for retrieving information, such as leads, at trade shows and other relatively large gatherings including festivals, concerts, conferences, hospitals, museums, parades, and demonstrations, it must again be noted that the present invention is certainly not so limited. Indeed, systems 10 and methods according to the present invention can be employed to great advantage in a wide variety of further applications wherever it would be useful to acquire information regarding individuals or sub-groups within groups of people and, additionally or alternatively, regarding mobile goods and merchandise.

In FIG. 1, the system 10 is depicted for clarity in a simplified format wherein each attendee 12 possesses a wireless communication unit 14, which can be an infrared (IR) wireless communication protocol unit, a radio frequency (RF) wireless communication protocol unit, or any other wireless communication protocol unit that may now exist or be hereafter developed. Each attendee 12 may further possess an identification (ID) tag. As will be discussed further hereinbelow, the wireless communication unit 14 and the ID tag can be separate, formed integrally, or coupled to one another in any appropriate manner. An exhibitor 16 is possessed of a wireless communication unit 18 for receiving communications from the wireless communication units 14 possessed by the attendees 12. In one embodiment, the wireless communication unit 18 possessed by the exhibitor 16 can comprise an IR-enabled handheld electronic information device, commonly referred to as a PDA or personal digital assistant and also indicated at 18.

Where infrared is employed as the wireless communication protocol, the wireless communication unit 14, which can be termed an IR Tag 14, retained by the attendee 12 can emit an IR code periodically, such as at 1-second intervals or substantially any other interval. Under such an arrangement, when the attendee 12 walks within range of an exhibitor 16 with a PDA 18 enabled with software according to the present invention, the PDA 18 will receive the IR code being transmitted by the IR Tag 14.

The IR code can comprise an identifying number or any other possible code. The PDA 18 then could exploit a wireless access point 20 of a wireless local area network (WLAN) to access information associated with the received IR code on a server 22. The WLAN can be of any appropriate type including, by way of example, a Wireless Fidelity (Wi-Fi) network architecture as crafted pursuant the 802.11 family of specifications developed by the Institute of Electrical and Electronics Engineers (IEEE). The server 22 can then provide identifying and other information regarding the attendee 12 retaining the IR Tag 14 based on the transmitted IR code. The PDA 18 can either immediately display the retrieved information on a display screen or provide the user with a link to the retrieved information.

The information retrieval process can be protected from unauthorized access by any appropriate means including, by way of example, a login process and, additionally or alternatively, an encrypted network arrangement. Under one possible encrypted network arrangement, the network can limit access only to certain network cards, such as via a Media Access Control (MAC) address. Where necessary or desirable, an information retrieval process history can be maintained for subsequent review and analysis whether by exhibitors, organizers, and/or attendees.

The wireless communication unit or IR Tag 14 can be controlled by any appropriate means. Under one exemplary arrangement, the control means can comprise a microcontroller, such as Model PIC12C508 schematically depicted in FIG. 2 mounted on an IR Tag 14, available from a company operating under the trade name MicroChip. Advantageously, such microcontrollers can be obtained relatively inexpensively and can be operated at 3V off of a simple watch battery. The object code for running on the microcontroller 24 can be as is shown in FIG. 4. Further information on the machine language of the microcontroller 24 can be found on Microchips' website. In FIG. 4, the colons on the left hand margin in the output are provided by the MicroChip company's compilers.

Figure 2:
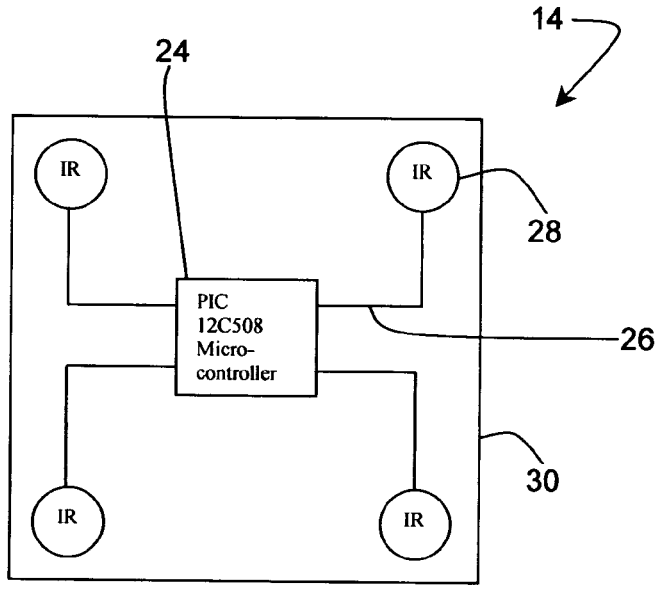
FIG. 2 is a schematic view of an IR Tag.
Figures 3, 4:
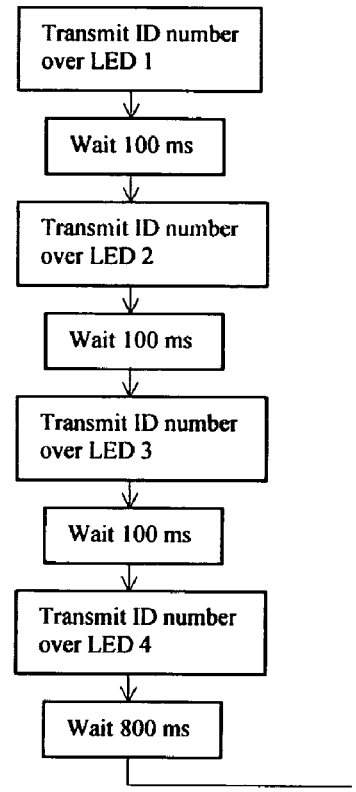
FIG. 3 is a flowchart of a controller program for an IR Tag according to the present invention.
FIG. 4 is an object code for a microcontroller usable under the present invention.

In FIG. 2, the microcontroller 24 is shown mounted on the IR Tag 14 having four input/output pins 26 with each being used to control an infrared LED 28. The microcontroller 24 can source about 25 mA on each input/output pin 26 such that, with a small resistor, the microcontroller 24 can directly drive an IR LED 28 at very short range. The range can be increased at least slightly by using the input/output pin 26 of the microcontroller 24 as an on/off switch for an n-p-n transistor, which would drive the resistor/IR LED 28 combination at a higher source current than the microcontroller 24 directly. It will be appreciated that FIG. 2 illustrates the basic components that may be employed on a printed circuit board (PCB) to emit an IR signal. To simplify the diagram, connections to ground have been removed. Each connection from the input/output pins 26 of the microcontroller 24 can comprise either a resistor or a transistor/resistor combination as described above.

The protocol used for IR Tags 14 employed under the present invention can take the basic form of an IrDA signaling arrangement with standard "raw IR" UART byte construction and a simple check sum. The IrDA usage can, for example, have no carrier wave at 2400 baud, pulse for 0 bit, no pulse for 1 bit, start bit 0, and stop bit 1. The packet can be described more exactly as having 6 bytes transmitted, roughly once per second, per IR LED 28, with an approximate total time of transmission of 24 mSec for each IR LED 28. The six bytes can have 1 start byte, 4 data bytes, and 1 checksum (bitwise XOR). Each byte can have 1 start bit, 8 data bits, and 1 stop bit (LSB first).

The bits are transmitted by use of IrDA signaling with each logic zero comprising a pulse and each logic 1 comprising a no pulse. In one embodiment, the minimum IrDA pulse is 1.63 µSec, and 2400 baud equates to a bit every 416.67 µSec. With that, a logic 0 can comprise a pulse for at least 1.63 µSec but preferably as short as possible to conserve battery power followed by a pause for the remainder of the 416.67 µSec. A logic 1 can comprise a pause for 416.67 µSec. In summary, therefore, at 2400 baud, a logic 0 will have a pulse length of 1.63 µS and a pause length of 415.04 µS, a logic 1 will have a pulse length of 0 and a pause length of 416.67 µS, a start bit will have a pulse length of 1.63 µS and a pause length of 415.04 µS, and a stop bit will have a pulse length of 0 S and a pause length of 416.67 µS.

Because the start byte is 1, any data packet that does not start with a one can be ignored. At the bit level, this looks like a start bit, 8 data bits, and a stop bit. Since the data should represent a 1, the data packet looks like a start bit, a logic 1, 7 logic 0's and a stop bit. Therefore, the byte logic and timing appears as follows:

| bit level: | Logic level: | IR level (1 = pulse, 0 = no pulse): |
|---|---|---|
| Start bit | 0 | 1 1.63 uS |
|  |  | 0 415.04 uS |
| Logic 1 | 1 | 0 416.67 uS |
| Logic 0 | 0 | 1 1.63 uS |
|  |  | 0 415.04 uS |
| Logic 0 | 0 | 1 1.63 uS |
|  |  | 0 415.04 uS |
| Logic 0 | 0 | 1 1.63 uS |
|  |  | 0 415.04 uS |
| Logic 0 | 0 | 1 1.63 uS |
|  |  | 0 415.04 uS |
| Logic 0 | 0 | 1 1.63 uS |
|  |  | 0 415.04 uS |
| Logic 0 | 0 | 1 1.63 uS |
|  |  | 0 415.04 uS |
| Logic 0 | 0 | 1 1.63 uS |
|  |  | 0 415.04 uS |
| Stop bit | 1 | 0 416.67 uS |

Under this scheme, one full byte takes approximately 4 mS.

The data bytes and the checksum byte are transmitted, least significant bit first, similarly to the 1 in the start byte. The checksum byte is a bitwise XOR of the entire bit stream, including start byte, transmitted as described above. For example, if each data byte is seen as a number from 1 to 256, one possible data tag is 10.46.145.213, which is transmitted as follows:

| 1 (start byte) | 1000 0000 |
| 10 | 0101 0000 |
| 46 | 0111 0100 |
| 145 | 1000 1001 |
| 213 | 1010 1011 |
| bitwise XOR | 1000 0110 = 97 |

Therefore, the checksum for such a packet would be 97, and that number would be transmitted as the final or sixth byte. The six bytes are transmitted in series so that the whole duty cycle of the entire transmission relative to one LED would be approximately 6×4 mS=24 mS.

By the described procedure, the IR Tag 14 can transmit a serialized ID number. If there are four LEDs 28 as shown in FIG. 2, then the program should have time to transmit the number four times. The system 10 then should wait a certain amount of time between subsequent transmissions. For system timing purposes, it may be advantageous to have a wait state in between each separate LED transmission.

The IR Tag 14 can be constructed in a manner similar to a typical printed circuit board (PCB) wherein Gerber files are first sent to the PCB fabricator. The PCB, such as that indicated at 30 in FIG. 2, is then printed with the Gerber files used to pick and place the components and the components then soldered on. The supplier of the microcontroller 24 can provide a commercial programmer to download code, such as the code of FIG. 4, to the microcontroller 24 in circuit such that the microcontroller 24 can be programmed after placement on the PCB 30. This also allows a unique ID or serial number to be written to a memory location on the microcontroller 24 for transmission by the IR Tag 14.

Advantageously, the printed circuit board 30 with the IR LEDs 28 mounted thereon can be placed inside an integrated name badge and ID Tag, which is also indicated at 14. The integrated badge 14 can then act as a traditional nametag at a show while also being capable of transmitting the unique identifying information according to the present invention. The integration of the name badge and the ID Tag 14 can happen prior to or during an event. In any case, a battery (not shown), which can be similar to a watch battery, can be inserted into the IR Tag 14 prior to usage. Where necessary or desirable, an insulative member (not shown), such as a plastic tab, can be removably associated with the battery to prevent unnecessary drainage of battery power prior to usage.

As shown in the flowchart of FIG. 3, the system 10 waits 800 ms between series of transmissions. The system 10 also waits 100 ms between transmissions relative to each LED 28. It will be appreciated that, with a number of IR Tags 14 transmitting in one area, there is a likelihood of cross talk between them. As used herein, cross talk can be considered to by two or more devices speaking simultaneously and in the same direction. Such cross talk would have no effect where radio frequency identification (RFID) is used. Where infrared is employed, the effect of cross talk will depend on the receiver. Where the system designer has total control over the IR receiver, he or she can create a program that could, knowing the structure of the packets as described above, determine what the two valid packets are. However, where the system 10 must use a fixed UART IrDA receiver, such as is found on most PDAs today, the system designer can do little in that regard. With that, the individual data packets would be lost and the PDA 18 would merely receive one random longer packet.

In a 2400-baud system, cross talk would be a relatively likely occurrence in a practice of the present invention where numerous IR Tags 14 would be simultaneously operating in close proximity. In a one-LED IR Tag 14, for example, one can assume that the LED 28 transmits, as described above, for 24 mS and then pauses for 976 mS. Where only two IR Tags 14 are activated randomly, then there would not be likely to be a problem. Indeed, in theory at least, there can be as many as 41 tags, each speaking in exact succession, without cross talk where the IR Tags 14 transmit according to the above specifications with one LED 28 on each tag and a 976 mS pause between transmissions. However, once there are 42 IR Tags 14 speaking under the protocol described above in the same area, there must be two Tags 14 talking at the same time. Of course, with a random distribution of start times, there is likely to be a problem well before 42 Tags 14. While increasing the baud rate would reduce the problem, the possibility of cross talk could not be completely eliminated, especially when one bears in mind that as many as 200,000 and more attendees participate in certain trade shows.

Advantageously, embodiments of the present invention incorporate means for preventing cross talk between IR Tags 14 by providing a range of legal wait times for the IR Tags 14. Embodiments of the invention can provide one range of legal wait times for the between LED wait and another wait time for between successive transmissions. For example, one could assume an effective between-LED-wait range of 50 mS to 200 mS and an effective wait time for successive transmissions of 500 mS to 1S. Both random wait times could be updated with each transmission.

A pseudo-random number can be generated from the serial number in each unit. For example, this could be done by successively multiplying the four bytes of the serial number together (mod 256 upon each succession) and using the resulting number as the random number. A slightly more random number could be found by multiplying this response by the bitwise inverse or substitute 170 for any zeros of each of the four bytes to avoid 0, 0, 0, 1 and 0, 0, 0, 2 from being immediately adjacent to one another. This random number from 1 to 256 can be used as an index to possible times.

By way of example, with the ID number 10.46.145.213 from above, one would multiply 10 by 46 to get 460 (modulo 256=204), then multiply 204 by 145 mod 256 to get 140, and then multiply 140 by 213 mod 256 to get 124. Therefore, the 124 would be the random number to be used. If the range of waiting times is 50 mS to 200 mS, then the waiting time could be calculated by the formula:

$$124/256 \times (200 \text{ mS} - 50 \text{ mS}) + 50 \text{ mS} = 122.6 \text{ mS}$$

Figure 5:
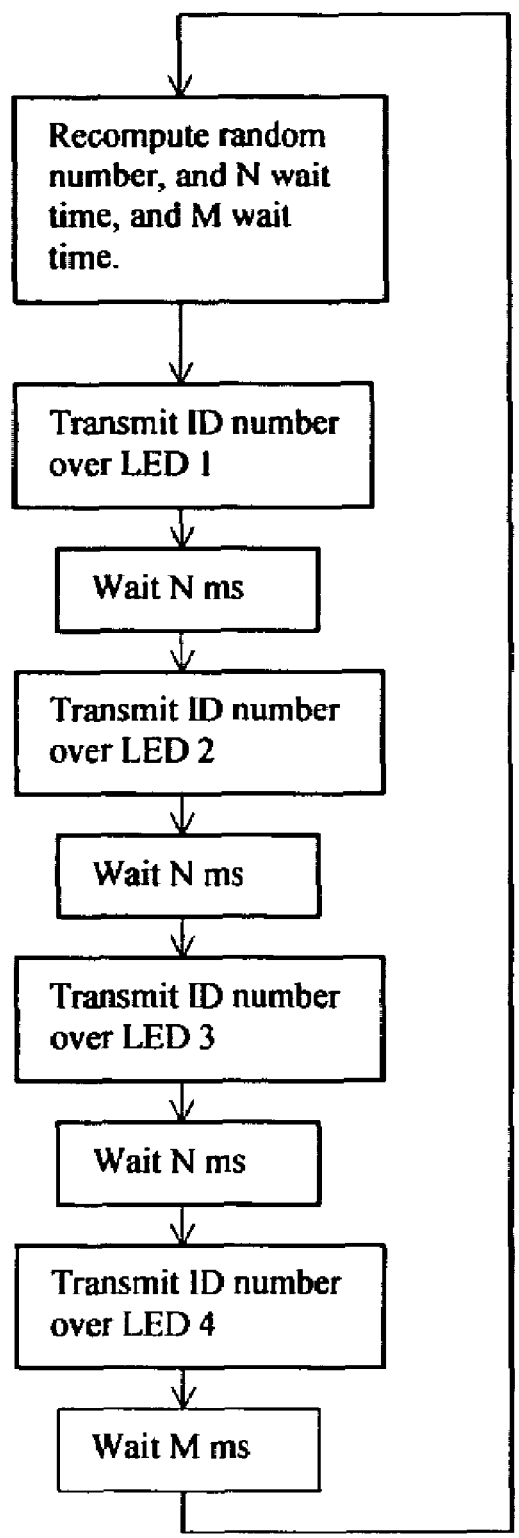
FIG. 5 is an alternative flowchart of a controller program for an IR Tag according to the present invention.

Therefore, 122.6 mS would be the wait time for between LED transmissions and the successive transmission wait time would be computed similarly with the different range of possible times. If the first two IR Tags 14 were transmitting the numbers 0.0.0.1 and 0.0.0.2, then the adjacent IR Tags 14 could have very similar wait times. However, that could be remedied as described above. FIG. 5 provides a flowchart for these randomly timed transmissions with N being the inter-LED wait time and M being the wait time between successive transmissions.

It has been found that, where the PDA 18 receives serial or ID numbers from the IR Tags 14 and then looks up those numbers on a wireless network and where the PDA 18 is a Microsoft Pocket PC, such as the Casio Cassiopeia, then two things can be easily achieved. First, IR ID numbers in IrDA format are easily read in a "raw mode." Second, internet lookups on a wireless local area network (WLAN), such as the Wireless Fidelity (Wi-Fi) network architecture, can be easily programmed. The PDA 14 should have an IrDA compatible IR port and, perhaps via a separately available sleeve, a CompactFlash slot. The CompactFlash slot can be employed to engage Wi-Fi, such as 802.11b, compatible network cards, which are available from companies such as Socket.

The Windows CE operating system on which the Pocket PC is based is an asynchronous operating system. It allows people to program separate threads that work together. Each of these threads can be shown on a separate flow chart since that is how they run. Of course, the present invention is not limited to the usage of the Windows CE operating system. Non-Windows-based PDAs 18 would work in a similar manner as would be obvious to one skilled in the art after reading this disclosure.

Figure 6:
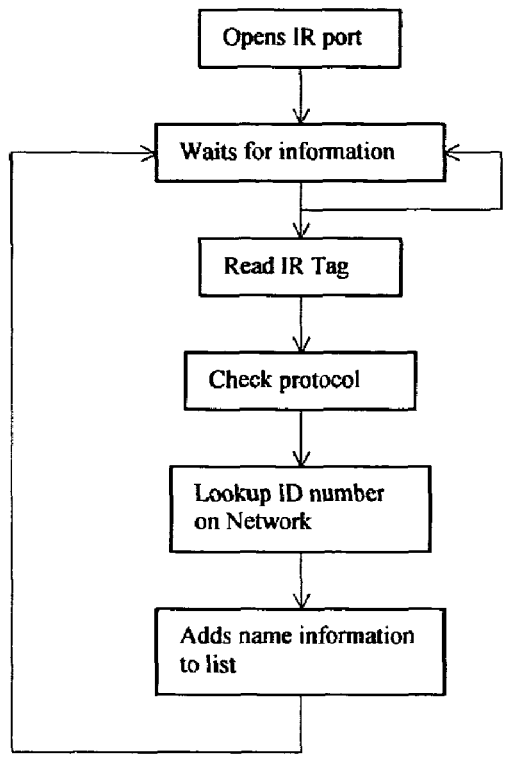
FIG. 6 is a flowchart for a PDA Tag reader program according to the instant invention.

What can be considered a first thread under the present system 10 is the communications thread depicted in FIG. 6. It opens the IR port on the PDA 18 and waits for information. Once it sees that information, it reads the IR Tag 14 information, checks the protocol as above, looks up the ID number on the network, and then adds the information to a list of recently seen IR Tags 14. On the server 22, the fact that a given user or exhibitor 16 with the given PDA 18 saw the attendee 12 with the IR Tag 14 in question is tracked.

Figure 7:
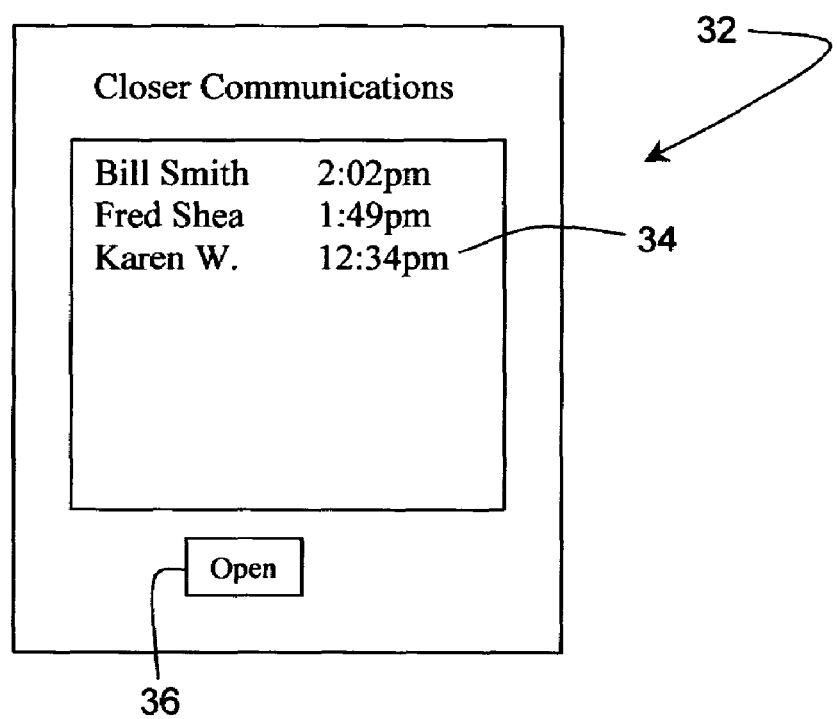
FIG. 7 is a depiction of a user interface for a PDA IR Tag reader employed pursuant to the present invention.

What can be considered a second program thread displays the list created by the first thread. A user interface 32 for an IR Tag reader PDA 18 employed pursuant to the present invention is depicted in FIG. 7. When a user or exhibitor 16 selects a given representation 34 of the retrieved IR Tag 14 information, the second program thread can request details regarding the attendee 12 holding the subject IR Tag 14. Of course, the selection of a representation 34 can be done in any appropriate manner, such as by double clicking on the representation 34 or by clicking on the representation 34 and tapping the open button 36.

In this example, the representation 34 of the retrieved IR Tag 14 information comprises a listing of each attendee's 12 name and the time that the attendee 12 visited the trade show booth of the exhibitor 16. In one embodiment, the second thread can open a browser, such as Internet Explorer, to request the details regarding the attendee 12 including personal details, such as name, position, and image; details regarding the attendee's company; and/or any other information that one might wish to provide or obtain. For convenience, that retrieved information will be referred to hereinafter as business card information. Once the business card information is selected and retrieved, it can be displayed on the user interface 32 of the PDA 18 whether all on a single display screen or by use of multiple display screens.

Under one possible refinement of the invention, the PDA 18 or the server 22 can employ particular conditions to assume that the exhibitor 16 is seeking to obtain a given attendee's business card information and then automatically retrieve and display the attendee's business card information on the user interface 32. For example, the PDA 18 can be induced to display the attendee's business card information automatically when the PDA 18 sees the same IR Tag 14 for a given amount of time, such as 3 seconds; when no other IR Tags 14 are perceived; and/or when the PDA 18 has not previously displayed the business card information for the specific attendee 12. One, two, all three, or even further conditions could be employed to trigger the automatic retrieval and display of the attendee's business card information.

The automatic or passive display of information could be modified or supplemented by a change to the IR Tag 14. Since the IR Tag 14 described above has four LEDs 28, one or more LEDs 28 could be used to transmit a special extra bit. The selected LED 28 could be driven at a lower power level than the other LEDs 28 so that the selected LED 28 would transmit a lesser distance than the more highly powered LEDs 28. By way of example, if the other LEDs 28 are driven at a power level capable of transmitting over a range of 6 feet, the selected LED 28 could be driven at a lower power level that would be capable of transmitting over only roughly 1.5 feet. With this, when the extra bit represented by the lower-powered LED 28 is received, the PDA 18 can know that the attendee 12 holding that IR Tag 14 is within the closer range of the selected LED 28. Based on this, the system 10 can assume that the exhibitor 16 is close to the attendee 12 with the received ID number and, therefore, that the exhibitor 16 would wish to receive the business card information of the attendee 12. The automatic or passive display could then be triggered either immediately or when the signal from the selected LED 28 is received for a given amount of time, such as 2 seconds, which can be a shorter time than described previously.

The installation application of the system 10 can install the IR Tag Reader application to the Startup menu of the PDA 18 so that the system program will start with each hard reset of the PDA 18. With that, it can be ensured that the application will be running throughout a trade show or other event. The IR Tag reader program can minimize its use of resources during time periods when the trade show or other event is probably not in operation, such as during evenings and the like. The IR Tag reader can be programmed to know when a given trade show or event is over and can be programmed to remove itself from the Startup menu and quietly shut down when the PDA 18 is next turned on. The application can remain in the memory of the PDA 18 for future use and could be reinitiated by a reprogramming of the end time of the current trade show or other event.

Figure 8:
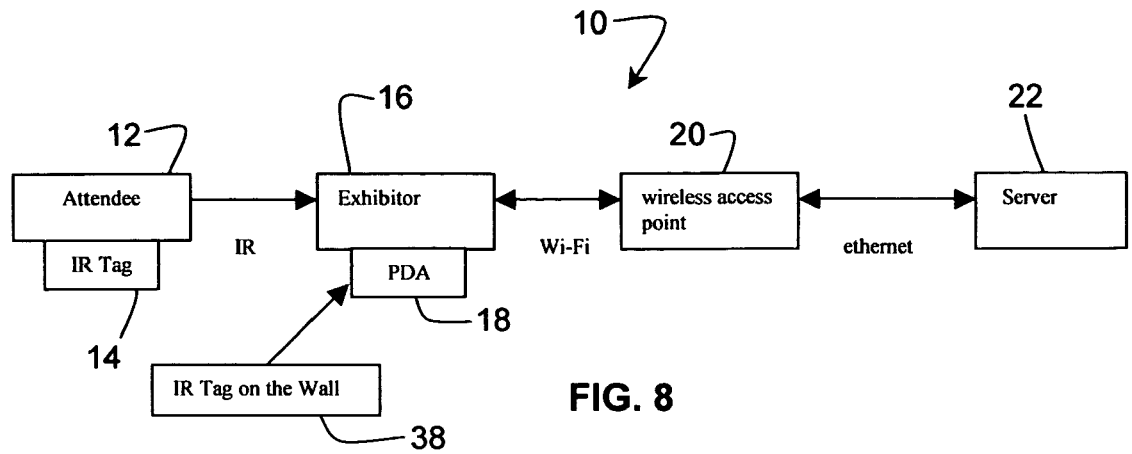
FIG. 8 is a simplified diagram of an alternative system according to the present invention.

An alternative embodiment of the system 10 for wireless information retrieval and content dissemination is depicted schematically in FIG. 8 where the system 10 is modified to include stationary IR Tags 38 disposed in selected locations in an area where the system 10 is to be employed, such as on or in the walls at a trade show facility. Under the present invention, such a location of the IR Tags 38 can enable location identification as will be described below.

With IR Tags 38 suitably located in a trade show facility, the server 22 can be programmed with information describing the attendee's IR Tags 14 and the stationary IR Tags 38. With that, the server 22 can know that IR Tag 14 with ID number 10.0.0.1 is attendee Bob Smith and that IR Tag 38 with ID number 11.0.0.1 is, for example, located at the Closer Communications trade show booth, which is near the north entrance.

Where the system 10 is set to track all IR Tags 14 and 38, then inferences can be made about location by looking at interspersed hits. For example, if at 2:03 p.m. a exhibitor's PDA 18 perceives Bob Smith's IR Tag 14 and at 2:04 p.m. sees the Closer Communications booth IR Tag 38, then it can be assumed that the exhibitor 16 met Bob Smith inside the Closer Communications booth at approximately 2 p.m. This heuristic method can be implemented with a simple maximum time method. If a location IR Tag 38 and a person IR Tag 14 are seen within a given maximum time, then the two events (i.e., the exhibitor 16 being at the location, and the exhibitor 16 meeting the attendee 12) can be presumed to have occurred at the same time such that one can presume that the exhibitor 16 met the attendee 12 at the location. This process could happen as a post-process or upon an implicit or explicit request, such as by the exhibitor 16, the attendee 12, the trade show organizer, or any other person. More complicated mathematical methods could also be carried forth where an attendee's or exhibitor's location is effectively a hidden variable, and, given the most recent location IR Tags 38, the system 10 determines the likelihood of the attendee or exhibitor being in a one or a variety of locations and chooses the most likely location based on distributions of data, possibly with labeled training data to generate these distributions.

The inventors have further observed that the use of PDAs 18 as the main means for data acquisition can present a problem with regard to completeness. Because PDAs were built mainly to act as personal information managers (i.e., calendar, to-do list, contact database), they were designed based on the principle that they will be put to use relatively infrequently, roughly 5% of the time. To save battery life, therefore, most PDAs turn off after just a few minutes of nonuse. As a result, most exhibitors' PDAs 18 will be off for the majority of the time. Ideally, therefore, there will be a receiving means that can be on continuously during the event and capable of receiving signals from IR Tags 14 across a wide portion of the premises, ideally everywhere or nearly everywhere.

Figure 9:
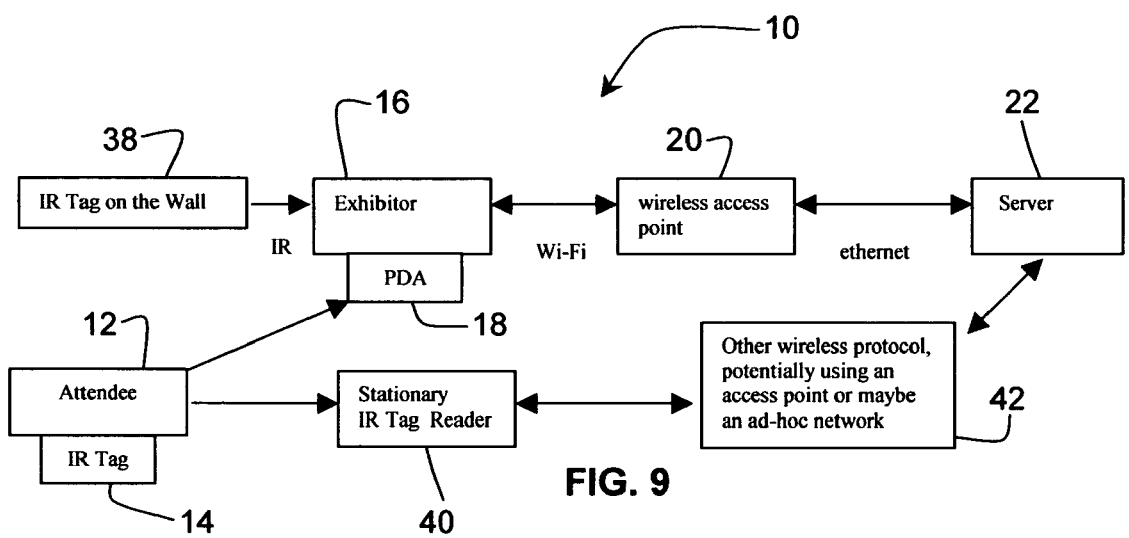
FIG. 9 is a simplified diagram of another alternative system according to the present invention.

Advantageously, the system 10 of FIG. 9 further includes one or more continuously operable IR Tag readers 40. The continuously operable IR Tag readers 40 can be located in any appropriate manner, such as by being disposed on wall surfaces at selected locations around the trade show premises. The continuously operable IR Tag readers 40 can work on batteries such that they would not need to be plugged in to a wall outlet or the like. The continuously operable IR Tag readers 40 can communicate with the IR Tags 14, the PDAs 18, and the server 22 by use of any wireless protocol, including Wi-Fi. Where the continuously operable Tag readers 40 rely on some other type of radio frequency transmission, such as those available on the RFPIC from MicroChip, they may additionally require a further access point 42.

Figure 10:
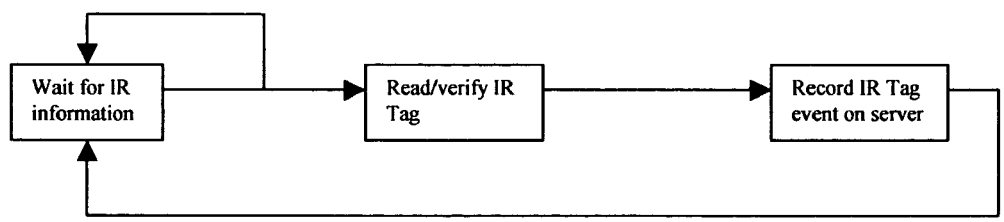
FIG. 10 is a flowchart for activities based on an IR Tag reader affixed to a static structure.

The continuously operable IR Tag readers 40 can be very similar to the programmed PDAs 18. They can read IR Tags 14 and, possibly, the PDAs 18, check their validity, and then report that information back to the server 22 as is shown in FIG. 10. This system 10 can be expected to need a little bit of RAM to make sure that the network is available so that no data is lost. Such an arrangement will be slightly different than the communications thread on the PDA 18 since in that case the thread was looking up information that was implicitly being recorded on the server 22. Here, the fact that the continuously operable IR Tag reader 40 saw the IR Tag 14 or the PDA 18 is explicitly being recorded. In this exemplary embodiment, no information other than an acknowledgement of receipt is returned to the continuously operable IR Tag reader 40. When the continuously operable IR Tag reader 40 sees an IR Tag 14 or a PDA 18, the server 22 can assume that the IR Tag 14 or the PDA 18 is in proximity to the location that is recorded with the continuously operable IR Tag reader 40. Inferences can then be made about a variety of facts including meeting locations of exhibitors 16 and attendees 12.

Figure 11:
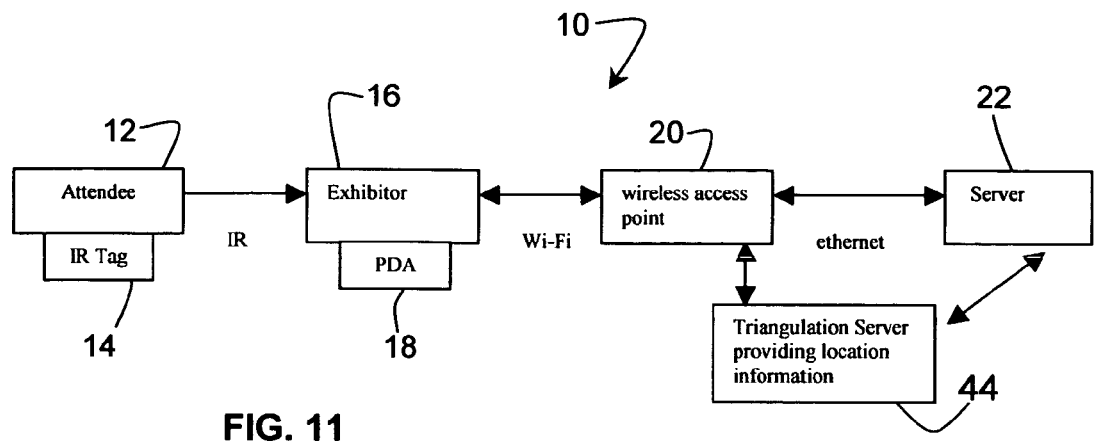
FIG. 11 is a schematic diagram of a system under the present invention employing triangulation server software.

In a further refinement, another, more direct means of finding the location of interactions would be to triangulate the location of the PDA 18 at the time of the transaction, such as under the arrangement of FIG. 11. Assuming the wireless network uses plural access points 20, like in an 802.11 arrangement, a triangulation server 44 can query each of the access points 20 as to a relative signal strength that it is seeing from the IR Tag 14 or the PDA 18. If one assumes that signal strengths are somewhat proportional to the distance of the attendee 12 with the IR Tag 14 or the exhibitor 16 with the PDA 18 from the given access point 20, then the system 10 can triangulate to estimate the location of the exhibitor 16 or the attendee 12. Under a practice like that provided by Newbury Networks, the system 10 could go one step further to require an initial process where a digital signature is taken of what each "location" looks like in terms of these relative signal strengths. Then, during actual runtime, the system 10 can compare what the current relative strengths look like to the database of location signal strengths and determine the location of the PDA 18 or the IR Tag 14 during the actual time that the system 10 is perceiving the PDA 18 or the IR Tag 14.

As shown in FIG. 11, the IR Tags 14 transmit infrared signatures to the area around them. The PDA IR Tag Reader program reads this IR signature and looks up the information on the central server 22 of the system 10. This interaction can be recorded on the central server 22. With enough PDAs 18 and IR Tags 12 during the course of a day where each interaction is recorded, a snapshot of what is happening during the day begins to emerge.

The central server 22 can be a web server and can any suitable program, such as Microsoft Internet Information Server or Apache. Modern web servers provide a scripting language, such as ASP on IIS or PHP on Apache, that offer an easy programming language to provide server-side scripting. With such a language, the programmer can create dynamic web pages while still presenting all of the information to the end-user as a standard html web page using standard http requests via a standard web browser such as Internet Explorer or Netscape. This scripting language allows the programmer to interface easily with other programs in a given web page.

Figure 12:
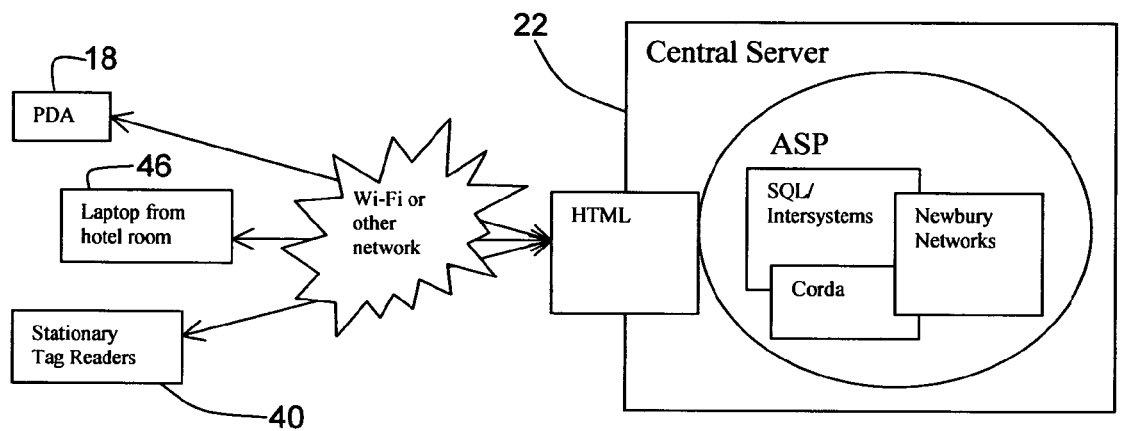
FIG. 12 is a schematic diagram of a system according to the instant invention with a central server.
Figure 13:
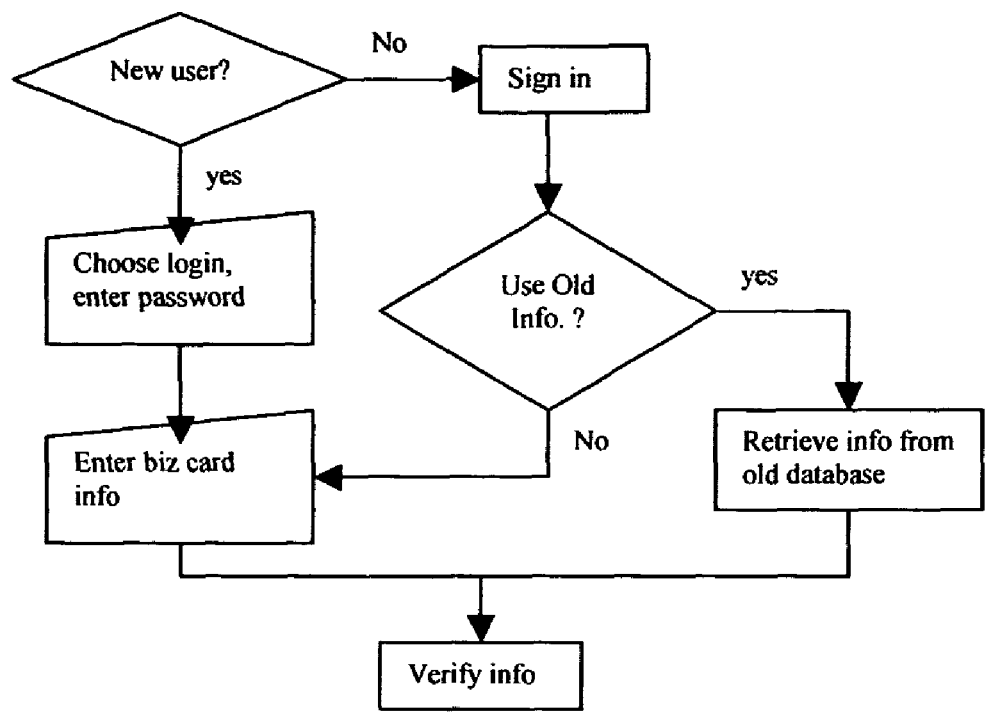
FIG. 13 is a flow chart of a pre-event sign-in process under the present invention.

In one practice of the invention, each attendee 12 or exhibitor 16 that wants to pre-register can do so on the Internet, such as via a laptop 46 or other method, as is shown in FIG. 12. As FIG. 13 shows, the attendee 12 or exhibitor 16 can choose a login ID and a password for a given show or, possibly, can carry over their registration information from a former event enabled with a system 10 according to the present invention, most likely from the same service provider, such as Closer Communications. Alternatively, that information could be carried over from an external database, such as one provided by the trade show operator. If the attendee 12 or exhibitor 16 is opening a new account, he or she will need to enter in his or her business card information (i.e., name, company, title, phone numbers, and possibly further information). The exhibitors 16 may need to make sure that their new accounts are connected to the overall exhibitor account.

Figure 14:
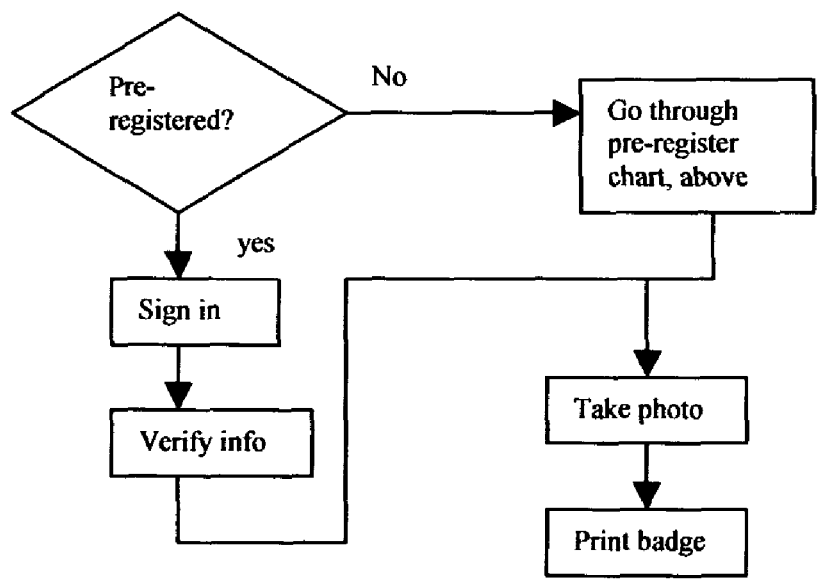
FIG. 14 is a flow chart of a sign-in process during an event.

In certain embodiments, such as is shown in FIG. 14, a pre-registered attendee 12 or exhibitor 16 can sit at a terminal during or immediately prior to the show, log in, verify his or her information, have his or her picture taken, and press a "print badge" button. If an attendee 12 or exhibitor 16 is not pre-registered, he or she will be able to choose a login and password, enter his or her personal information at a terminal, or have a trade show employee enter the information for him or her, such as from a business card. His or her picture can then be taken.

Once the badge is printed, it can be coupled with an IR Tag 14, such as into a casing that has been integrated into an otherwise traditional badge. Where an insulative member, such as a plastic tab, has been associated with the battery of the IR Tag 14, the tab can be removed from the IR Tag 14 to induce the IR Tag 14 into operation. A trade show employee can then use a special PDA application to associate the IR Tag 14 with the attendee 12 or exhibitor 16. That application reads the number off the IR Tag 14 and allows the employee to select the appropriate attendee 12 or exhibitor 16 from a list of recently printed badges or by searching for the particular attendee 12 or exhibitor 16 in the database by name. The preset ID number of the IR Tag 14 is then associated with the appropriate attendee 12 or exhibitor 16 as the case may be. Should an attendee 12 or exhibitor 16 lose an IR Tag 14, another IR Tag 14 can be similarly associated with the attendee 12 or exhibitor 16 with no loss of information.

If the person is an exhibitor 16, he or she must also have a PDA 18. Of course, attendees 12 may sometimes also have PDAs 18, particularly if there are services set up, such as virtual booths and scheduling services. Once the attendee 12 or exhibitor 16 has a login name and password, as above, those can be used to log in to the server 22, and the PDA 18 on which the login takes place can now be associated with the appropriate exhibitor 16 or attendee 12.

Figure 15:
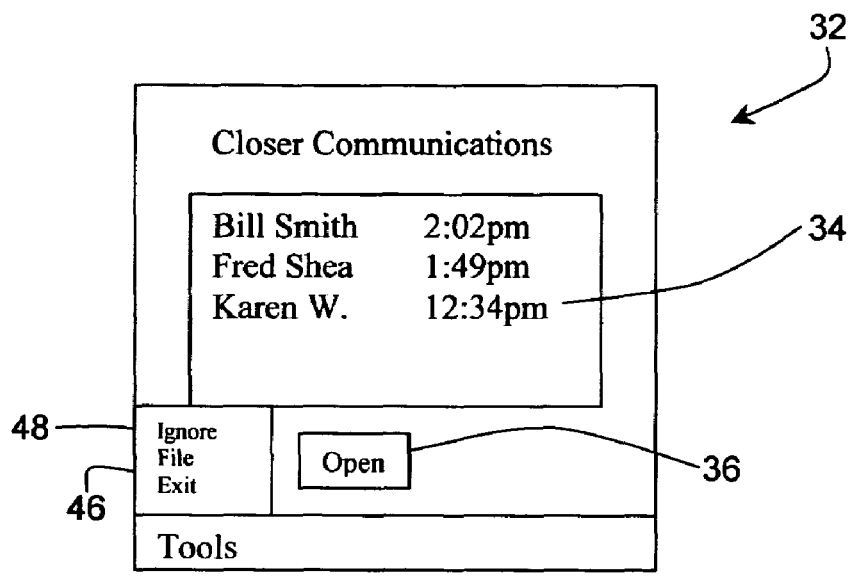
FIG. 15 is a depiction of a user interface for a PDA employing the present invention with an "Ignore" function.

Since a given exhibitor's or, where he or she possesses one, attendee's PDA 18 and IR Tag 14 will be in close proximity throughout the day, substantial unnecessary traffic can be avoided by making sure that the PDA 18 ignores the IR Tag 14 of the exhibitor 16 or attendee 12 associated with it. The server 22, since it already knows the PDA ID number and the IR Tag ID number, can inform the PDA 18 to ignore the IR Tag 14 of the exhibitor 16 or attendee 12. As FIG. 15 illustrates, a routine can also be provided to enable the entry to the PDA 18 of IR Tags 14 to ignore. In the example shown in FIG. 15, for example, the current user is Bill Smith. The attendee 12 or exhibitor 16 can then click on Bill Smith and in a tool bar pop up menu 46 click on an "ignore" function 48 to add this IR Tag 14 to an ignore list. The attendee 12 or exhibitor 16 can employ the same methodology to ignore IR Tags 14 of co-workers and others who might be expected to be in proximity to him or her during the trade show. The ignore list can be edited at will to add or delete persons relative to the ignore list. Where one or more IR Tags 14 are ignored, the server 22 can be caused either to perceive that the IR Tags 14 are seen or not, depending on the needs and goals of the user.

In addition to collecting basic business card information, the system 10 can also collect attribute data from the attendees 12 and exhibitors 16, such as gender, age, and salary ranges, which, of course, might be optional. Similarly, the system 10 could collect, retrieve, and disseminate the attendees' and exhibitors' interests and other characteristics, such as hobbies, reasons for coming to the show, and the like.

Figure 16:
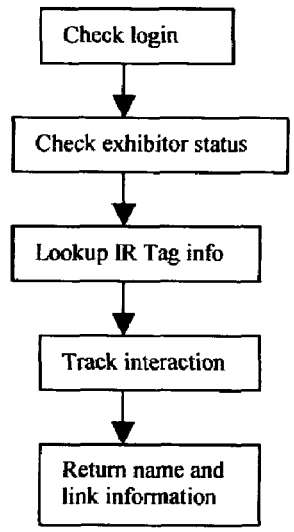
FIG. 16 is a flowchart of a server-side process for retrieving information regarding an IR Tag.
Figure 17:
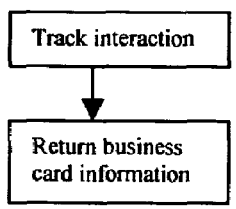
FIG. 17 is a flowchart of a server-side process of retrieving business card information.

Referring to FIG. 16, the "Lookup ID number on Network" step can now be described in further detail. Under one practice of the invention, that step is actually an http request of the server 22. In the sign-in process and the association of the attendee 12 or exhibitor 16 to an IR Tag 14, there is a database connecting the IR Tag 14 and the attendee 12 or exhibitor 16. When the PDA application requests the information about a given IR Tag 14, the server 22 first determines the PDA user's login status. If the attendee 12 or exhibitor 16 is not logged in, the system 10 asks the person to login. If an asserted exhibitor 16 is logged in, the system 10 checks to make sure the person is associated with a paying exhibitor 16. Finally, the system 10 checks who is associated with the requested IR Tag 14 and records the fact that the given PDA 18 requested information about the given attendee 12. This request for information only represents that the PDA 18 has seen the IR Tag 14. This does not necessarily mean that the holder of the PDA 18 has actually requested to see the information about the attendee 12. The server 22 could also do a lookup to find the location of the PDA 18 if a separate triangulation system is being used. Once this information is recorded, the server 22 can then return a link to the requested information.

This procedure results in the appropriate name being on a list of recently seen IR Tags 14 on the PDA 18. If the holder of the PDA 18 clicks on the name and requests the information or through persistence the information is implicitly requested, the PDA 18 makes a direct request, such as via http, to see the information on the subject attendee 12 or exhibitor 16 since it already has a direct http link to the information. With this, the system 10 can record that the user of the PDA 18 actually met and spoke with the person associated with the IR Tag 14. Then, the page describing the attendee 12 is put together including, for example, the attendee's business card information, photo, and possibly further information. The retrieved information can also provide a history of where the attendee 12 has been within the trade show premises.

The system 10 can assemble certain information in advance of the show to maximize the value from his or her participation in the show. For example, once an attendee 12 or exhibitor 16 is logged into the show database, such as via the Internet, he or she can begin to search through the list of attendees 12 and exhibitors 16, such as to find must-see people. With this, the exhibitor 16 or attendee 12 can receive a popup alert when any of the selected attendees 12 or exhibitors 16 comes into proximity with the exhibitor 16 or attendee 12, such as by entering an exhibitor's booth. In a similar manner, a user can cause a popup alert to occur when a person of a more generic profile, such as "buyer from a large telecommunications corporation," comes into proximity with him or her.

The user can also create forms that can popup along with the business card information of each attendee 12 or exhibitor 16. Then, the user can fill out the forms during the show and collect the information on the server 22. For example, a user might have a form inquiring, "do I want to follow up with this attendee?", "Are they interested in product X or Y?", or any other possible questions or notes. For example, each time a user sees an attendee's business card information, he or she can take notes on the PDA 18, and those notes can be stored on the server 22 for later reference. The system 10 could also enable a searching of the notes. For example, an exhibitor 16 could search for all persons labeled as "hot prospects." Still further, the system 10 could enable exhibitors 16 and attendees 12 to organize and review attendees 12 and exhibitors 16 based on responses to form questions and the like. After the show, collating the attendees by these responses is then possible.

Similarly, the system can provide predictive scoring to an exhibitor 16 or attendee 12 based, for example, on profiles set up by the user before the show to indicate how well the attendee 12 or exhibitor 16 matches those criteria. One will appreciate that this could be done in a variety of ways, such as by giving a sub score for each of the individual criterion. For example, if the user is looking for "buyers from large telecommunications corporations," and the current attendee 12 is a buyer from a medium size company, there might only be a partial match, such as "48%". Predictive scoring could alternatively be carried out by using the rankings of the other attendees 12 or exhibitors 16. For example, if a given attendee 12 or exhibitor 16 consistently scored people who were CEOs highly, then when another CEO walks in to the booth, this would boost that attendee's predictive score by a given amount. Of course, more complicated mathematical models that attempt to track exactly what a given attendee 12 or exhibitor 16 is looking for as a hidden variable, and each of the measurable variables can also be used as a function thereof. Even further, exhibitors 16 and attendees 12 can provided a simple ranking of attendees 12 and exhibitors 16. The ranking can have different meanings for different users, but one obvious ranking would be how much do the person want to follow up with the other party after the show. With this, a user could employ the ranking to be left with a short list of hot prospects.

The system 10 can also enable a user to gain answers to a variety of questions and to create graphs and statistics during and after a given show. For example, an exhibitor 16 can inquire as to what traffic looks like in his or her booth. An exhibitor 16 can inquire as to how many people were in his or her booth over the course of one day, a portion of a day, and over an entire show. Indeed, the server 22 can collate the number of distinct people in the Exhibitor's booth by hour or minute or by day. Using appropriate programming, such as PopChart from Corda, this information can be shown graphically from the server 22 to a web browser. An exhibitor 16 can also see who was in his or her booth at a specific time. Given such a chart, the user can drill down into the chart. If there was a particularly busy hour from 2-3 p.m. in the afternoon, the user can click on the bar representing that hour and see the list of attendees 12 in his or her booth at that time. The chart can also facilitate decisions on the sales process. For example, if the booth seemed to be more popular in the afternoon, perhaps the exhibitor 16 was doing something more productive then. The exhibitor 16 can also determine which people are most interested in his or her products or services. Another collation of the information can be made by the amount of time that each attendee 12 spent in the exhibitor's booth. Such a list can be sorted and graphed so that the people who spent the most time in the exhibitor's booth can be determined. The exhibitor 16 can also find out who missed the booth entirely. Each piece of information can be not only interesting but also instructive.

Even further, there may be a situation where an exhibitor looking through these charts discovers that one of his or her must-meet people has completely missed his or her booth. Because this person might have been a large part of why the exhibitor 16 came to the trade show in the first place, he or she may wish to know where that person is at any given time. By learning where the person was last seen on the show floor the exhibitor 16 could proactively seek the person out. Similarly, if the exhibitor 16 has not seen many people in that class of people he or she indicated was interesting, he or she can locate and, possibly, contact them.

One common complaint about tradeshows is that there is always a bag of stuff that the attendees 12 need to lug around during the show. Under the present invention, if the attendees 12 and exhibitors 16 log in before the show, exhibitors 16 can arrange literature about their products and services such that an attendee 12 can opt to have the exhibitor 16 or the attendee 12 receive the literature and other information by email by a simple clicking on a preset link or the like.

To shield attendees 12 from unethical or overly aggressive exhibitors 16, the system 10 can also provide an anti-spam measure. For example, a temporary forwarding address, such as 12345@closer.com, can be employed to forward material to the attendee's real email account. With this, if the attendee 12 is getting unwanted email, he or she can log into the website of the system 10 and turn off the forwarding.

The knowledgeable observer will appreciate that the most important question an exhibitor 16 or attendee 12 can ask is "whom did I meet at the show?" The system 10 according to the present invention can answer this question in a number of ways. For example, it can list all people that the exhibitor 16 or attendee 12 saw in order. Looking at the list, perhaps the exhibitor 16 or attendee 12 could refresh his or her memory. Given that same list, the system 10 could show the pictures of all of the attendees 12 and exhibitors 16 that the exhibitor 16 or attendee 12 met. A user who is better with faces than names could then pick out the face and find out all of the contact information relative to the specific person. Even further, exhibitors 16 and attendees 12 can do text searches through the notes that he or she kept throughout the show. As mentioned before, he or she can sort through all of the various forms he or she filled out about others, or he or she can list them by the rating that he or she applied. The exhibitor 16 or attendee 12 can list the persons he or she met for a specific time of day and can click on particular persons on the list to retrieve information regarding that person. One can even search by location so that, for example, a user who met a person near the snack bar can see a list of all persons he or she met in that area.

Still further, where a user remembers anything about an attendee 12 or exhibitor 16 at all, such as demographic data or the fact that she skis, the user can sort through all of the attendees 12 or exhibitors 16 that meet those criteria or only the attendees that he met that meet those criteria. Conversely, a user can search for customers or suppliers with particular characteristics, such as those who are interested in skiing or the like. Exhibitors 16 can learn which attendees 12 of those that entered his or her booth have selected demographic or interest characteristics. Exhibitors 16 can also see a list of booths visited by each attendee 12.

Even further information gathered in the system database can be sorted and presented in a myriad of ways, all via access to the show database via the Internet or any other method. With this, one can compare the activities of one booth to another. For example, the results of one booth at a trade show can be presented side-by-side or superimposed. With this, the relative performance of different exhibitors 16 at a show can be measured and displayed. Furthermore, a given exhibitor 16 can compare his or her own booth at one trade show to his or her booth at another trade show or at the same trade show in previous years. For each graphical representation of occurrences during a show, a user can click on a given part of the graph to be taken straight to the data behind that graph. In this manner, the exhibitor 16 can view either the graphical representation of what happened at the show, or he or she can drill down into the hard data behind the graph.

Provided the subject exhibitor 16 has made himself available for reservations, Attendees 12 can also schedule time with the exhibitor 16 during the trade show by selecting an exhibitor 16 with whom he or she wants to meet and reserving a time at registration or during pre-registration on the Internet. The reservation can be stored in the central database.

During the show, software on the exhibitor's PDA 18 can periodically query the central server 22 for any information to be pushed to the PDA 18. Such information may, by way of example, be the appearance of an attendee 12 who has received a high predictive score or a simple reminder that he or she has an appointment. The PDA software grabs the photo and basic business card data from the attendee 12 with whom the exhibitor 16 has an appointment and displays this on the PDA 18 to remind the exhibitor 16 to meet the attendee 12 and to better enable the exhibitor 16 to find the attendee 12 on the crowded trade show floor.

Under one practice of the invention, there can be two servers 22. One server 22 can act as a primary server 22 collecting and serving data to the thousands of clients on the trade show floor. The primary server 22 can automatically copy its data to a secondary server 22 as a backup in the event of a failure of the primary server 22. Throughout the day, the secondary server 22 can copy its data to a web server based, for example, on an Internet Service Provider Network Operations Center. Such a tertiary server could enable exhibitors 16 to retrieve information after the show has concluded. While data prior to the end of the show may be available only on the local intranet. However, because the tertiary server can receive its information in a real-time or near-real time manner, it is possible for remote users to access data about the goings on at the show as it happens. With this, employers can use the system 10 to monitor employees at a show and thereby better manage their investment in exhibiting or sending employees to attend the show.

In certain embodiments, each exhibitor 16 can be assigned a certain set of permissions recorded in a separate table of permissions. These permissions can correspond, for example, to the level of service purchased. For example, Company A may only want to purchase lead retrieval capabilities for its own booth, while Company B may only be interested in its own booth and that of particular competitors, and while Company C wants to access to all available information. Further, permissions may be set to features or capabilities. For example, Company A may only be interested in after-show reports, while Company B may want predictive scoring capabilities in their package, and Company C may want to use the remote monitoring capabilities of the system 10. Before fulfilling any request for information made by a user, the system 10 can check the permissions table to ensure that the request has been properly purchased or authorized. If the request has been properly purchased or authorized, then the request can be fulfilled. If the request has not been purchased or authorized, then the user will be directed to a web page where he or she can purchase the desired information or otherwise gain authorization to view it.

With a plurality of exemplary embodiments and details of the present invention for a wireless information retrieval and content dissemination system and method disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventors. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall

We claim as deserving the protection of Letters Patent:

1. A method for the wireless retrieval of information regarding mobile bodies and for disseminating content based on retrieved information, the method comprising the steps of:
providing a wireless communication sending unit for being retained relative to a first mobile body wherein the wireless communication sending unit comprises a means for emitting a signal;
providing a wireless communication receiving unit for being retained relative to a second mobile body wherein the wireless communication receiving unit comprises a means for receiving the signal emitted by the wireless communication sending unit;
providing a central server for retaining information wherein the central server retains information regarding the first mobile body;
providing an identifying association between the wireless communication sending unit and the first mobile body;
enabling an emission of an identifying signal from the wireless communication sending units;
providing a wireless access point;
establishing a wireless local area network arrangement involving the wireless communication sending unit, the wireless communication receiving unit, the central server, and the wireless access point;
wherein the wireless communication receiving unit has a display screen for enabling a display of transmitted information regarding the first mobile body;
enabling a transmission of information regarding the first mobile body retaining the wireless communication sending unit to the wireless communication receiving unit in response to a receipt of a signal from the wireless communication sending unit retained by the first mobile body by the wireless communication receiving unit; and
enabling a display of information received regarding the first mobile body retaining the wireless communication sending unit on the display screen of the wireless communication receiving unit.

2. The method of claim 1 further comprising the step of causing a signal to be emitted from the wireless communication sending unit.

3. The method of claim 2 further comprising the step of receiving a signal from the wireless communication sending unit by the wireless communication receiving unit when the wireless communication sending unit is in a given proximity to the wireless communication receiving unit thereby enabling a determination of whether the wireless communication sending unit is in the given proximity with the wireless communication receiving unit.

4. The method of claim 3 wherein the step of emitting a signal from the wireless communication sending unit comprises emitting periodic identification signals.

5. The method of claim 3 further comprising the step of providing a stationary wireless communication receiving unit for being disposed in a stationary location and for receiving a signal from the wireless communication sending unit by the stationary wireless communication receiving unit when the wireless communication sending unit is in a given proximity to the stationary wireless communication receiving unit thereby enabling a determination of whether the wireless communication sending unit is in the given proximity with the stationary wireless communication receiving unit and, therefore, an approximate location of the wireless communication sending unit.

6. The method of claim 3 further comprising the step of providing a continuously operable wireless communication receiving means disparate from the wireless communication receiving unit for ensuring a continuous receipt of signals from the wireless communication sending unit.

7. The method of claim 3 further comprising the step of providing a triangulation server with a means for querying the wireless access point as to a relative signal strength of the wireless communication sending unit to enable an estimate of the location of the wireless communication sending unit.

8. The method of claim 7 further comprising the step of testing signal strengths received by the triangulation server based on relative locations of wireless communication sending units and the step of comparing test signal strengths for known locations relative to received signal strengths for unknown locations to approximate unknown locations of wireless communication sending units.

9. The method of claim 3 further comprising the step of providing a means for enabling an ignoring by the wireless communication receiving unit of signals received from a selected wireless communication sending unit.

10. The method of claim 3 further comprising the step of providing a means for inducing an alert relative to the wireless communication receiving unit in response to a receipt of a signal from a selected wireless communication sending unit.

11. The method of claim 1 wherein the wireless communication sending unit operates under an infrared wireless communication protocol and wherein the wireless communication receiving unit comprises an infrared enabled handheld electronic information device.

12. The method of claim 11 wherein the wireless local area network employs a Wireless Fidelity (Wi.Fi) network architecture.

13. The method of claim 1 wherein the central server retains a history of signals received by the wireless communication receiving unit from the wireless communication sending unit and of information transmitted to the wireless communication receiving unit in response to the receipt of signals from the wireless communication sending unit.

14. The method of claim 1 wherein the step of providing a wireless communication sending unit comprises providing a plurality of wireless communication sending units, each wireless communication sending unit for being retained relative to a different mobile body.

15. The method of claim 14 further comprising the step of enabling an emission of periodic signals from each of the plurality of wireless communication sending units and further comprising the step of providing a means for preventing cross talk between the plurality of wireless communication sending units.

16. The method of claim 15 wherein the periodic signals emitted by each wireless communication sending unit have at least one wait time and wherein the means for preventing cross talk between the plurality of wireless communication sending units comprises a means for individually varying the wait time for each wireless communication sending unit.

17. The method of claim 16 wherein each periodic signal comprises at least one transmission of an identification number for each wireless communication sending unit and wherein the means for selectively varying the wait time comprises a means for generating a random wait time based on a mathematical calculation involving the identification number of the wireless communication sending unit.

18. The method of claim 17 wherein each periodic signal emitted from each wireless communication sending unit comprises an emitting of the identification number for the wireless communication sending unit a plurality of times with each emitting of the identification number separated by a between-number wait time and with each periodic signal separated by a between-signal wait time.

19. The method of claim 17 wherein the identification number for each wireless communication sending unit is formed by a plurality of bytes and wherein the mathematical equation involving the identification number involves a successive multiplication of the bytes forming the identification number.

20. The method of claim 19 wherein each wait time is within a range of legal wait times with a minimum wait time and a maximum wait time separated by a number of units and wherein the mathematical equation comprises multiplying successive bytes of each identification number and determining a modulo of that number until all bytes are used to produce a product, then dividing the product by the modulo to produce a result and multiplying the result by the number of units in the range of legal wait times, and then adding the minimum wait time thereto to produce the wait time.

21. The method of claim 20 wherein each periodic signal emitted from each wireless communication sending unit comprises an emitting of the identification number for the wireless communication sending unit a plurality of times with each emitting of the identification number separated by a between-number wait time and with each periodic signal separated by a between-signal wait time.

22. The method of claim 21 wherein each wireless communication sending unit has a plurality of infrared LEDs and wherein each periodic signal comprises an emitting of the identification number by each of the plurality of infrared LEDs in succession.

23. The method of claim 1 further comprising the step of enabling a transmission of information regarding the first mobile body to the wireless communication receiving unit in response to a receipt of a signal from the wireless communication sending unit, the transmission of information comprising enabling receiving an identifying signal from the wireless communication sending unit, looking up the identifying signal in a database retained on the central server, and transmitting information regarding the first mobile body from the central server to the wireless communication receiving unit.

24. The method of claim 23 wherein the wireless communication receiving unit has a means for enabling a request for additional information regarding the first mobile body from the central server.

25. The method of claim 24 wherein the additional information includes an image of the first mobile body.

26. The method of claim 22 further comprising the step of initiating an automatic request for additional information regarding the first mobile body based on a predetermined condition.

27. The method of claim 26 wherein the step of initiating an automatic request for additional information regarding the first mobile body comprises initiating an automatic request based on a receipt of periodic signals from the wireless communication sending unit for a continuous predetermined time.

28. The method of claim 26 further comprising the step of providing a means for determining when the wireless communication sending unit has come within a predetermined approximate range of the wireless communication receiving unit and wherein the step of initiating an automatic request for additional information regarding the first mobile body comprises initiating an automatic request based on the wireless communication sending unit coming within the predetermined approximate range of the wireless communication receiving unit.

29. The method of claim 28 wherein the step of emitting periodic signals from the wireless communication sending unit comprises emitting a first periodic signal over a first distance range and a second periodic signal over a second distance range wherein the second distance range is smaller than the first distance range and wherein the automatic request is initiated in response to a receipt of the second periodic signal by the wireless communication receiving unit.

30. A method for the wireless information retrieval regarding persons among a group of persons and for disseminating content based on retrieved information, the method comprising the steps of:
providing a plurality of wireless communication sending units, each for being retained by a person about whom information is to be retrieved, wherein each wireless communication sending unit comprises a means for emitting a signal;
providing an identifying association between each wireless communication sending unit and a given person;
providing a plurality of wireless communication receiving units, each for being retained by a person who is to receive information, wherein each wireless communication receiving unit comprises a means for receiving the signal emitted by the wireless communication sending units;
providing at least one central server for retaining information wherein the central server retains information regarding persons who are to retain wireless communication sending units;
providing at least one wireless access point;
establishing a wireless local area network arrangement involving the wireless communication sending units, the wireless communication receiving units, the central server, and the wireless access point;
enabling an emission of an identifying signal from the wireless communication sending units;
enabling a transmission of information to a given wireless communication receiving unit regarding a person retaining a wireless communication sending unit in response to a receipt of a signal from the wireless communication sending unit retained by that person by the wireless communication receiving unit receiving the signal;
wherein each wireless communication receiving unit has a display screen for enabling a display of transmitted information regarding persons retaining wireless communication sending units; and
enabling a display of information received regarding the person retaining the wireless communication sending unit on the display screen of the wireless communication receiving unit.

31. The method of claim 30 further comprising the step of receiving a signal from a wireless communication sending unit by a wireless communication receiving unit when the wireless communication sending unit is in a given proximity to the wireless communication receiving unit thereby enabling a determination of whether the wireless communication sending unit is in the given proximity with the wireless communication receiving unit.

32. The method of claim 31 further comprising the step of transmitting information to a given wireless communication receiving unit regarding a person retaining a wireless communication sending unit comprising receiving the identifying signal from the wireless communication sending unit, looking up the identifying signal in a database retained on the central server, and transmitting information regarding the person from the central server to the wireless communication receiving unit and displaying information regarding the person on the display screen of the wireless communication receiving unit.

33. The method of claim 32 wherein each wireless communication receiving unit has a means for enabling a request for additional information regarding the person retaining the wireless communication sending unit from the central server.

34. The method of claim 33 wherein the additional information includes an image of the person.

35. The method of claim 32 wherein the central server retains a history of signals received by the wireless communication receiving units from the wireless communication sending units and of information transmitted to the wireless communication receiving units in response to the receipt of signals from the wireless communication sending units.

36. The method of claim 35 further comprising the step of providing a means for enabling a selective review of information relating to signals received by the wireless communication receiving units and of information transmitted to the wireless communication receiving units in response to the receipt of signals from the wireless communication sending units.

37. The method of claim 36 further comprising the step of providing a means for enabling Internet access to details regarding the history of signals received by the wireless communication receiving units from the wireless communication sending units and of information transmitted to the wireless communication receiving units in response to the receipt of signals from the wireless communication sending units.

38. The method of claim 36 further comprising the step of providing a means for enabling varied levels of access to information based on user-specific authorizations.

39. The method of claim 31 further comprising the step of initiating an automatic request for additional information regarding the person retaining the wireless communication sending unit based on a predetermined condition.

40. The method of claim 39 wherein the step of initiating an automatic request for additional information regarding the person comprises initiating an automatic request based on a receipt of periodic signals from the wireless communications sending unit for a continuous predetermined time.

41. The method of claim 39 further comprising the step of providing a means for determining when the wireless communication sending unit retained by the person has come within a predetermined approximate range of the wireless communication receiving unit and wherein the step of initiating an automatic request for additional information regarding the person comprises initiating an automatic request based on the wireless communication sending unit retained by the person coming within the predetermined approximate range of the wireless communication receiving unit.

42. The method of claim 41 wherein the step of enabling an emission of a signal from the wireless communication sending unit comprises enabling an emission of a first periodic signal over a first distance range and a second periodic signal over a second distance range wherein the second distance range is smaller than the first distance range and wherein the automatic request is initiated in response to a receipt of the second periodic signal by the wireless communication receiving unit.

43. The method of claim 30 further comprising the step of providing a stationary wireless communication receiving unit for being disposed in a stationary location and for receiving a signal from wireless communication sending units by the stationary wireless communication receiving unit when the wireless communication sending units come into a given proximity to the stationary wireless communication receiving unit thereby enabling a determination of when each wireless communication sending unit is within the given proximity to the stationary wireless communication receiving unit and, therefore, an approximate location of each wireless communication sending unit that is within the given proximity to the stationary wireless communication receiving unit.

44. The method of claim 30 further comprising the step of providing a continuously operable wireless communication receiving means disparate from the wireless communication receiving units for ensuring a continuous receipt of signals from the wireless communication sending units.

45. The method of claim 30 further comprising the step of providing a triangulation server with a means for querying the wireless access point as to a relative signal strength of the wireless communication sending units to enable an estimate of the location of the wireless communication sending units.

46. The method of claim 45 further comprising the step of testing signal strengths received by the triangulation server based on relative locations of wireless communication sending units and the step of comparing test signal strengths for known locations relative to received signal strengths for unknown locations to approximate unknown locations of wireless communication sending units.

47. The method of claim 30 further comprising the step of providing a means for enabling an ignoring by the wireless communication receiving units of signals received from a selected mobile communications sending unit.

48. The method of claim 30 further comprising the step of providing a means for inducing an alert relative to a given wireless communication receiving unit in response to a receipt of a signal from a selected wireless communication sending unit.

49. The method of claim 30 wherein the wireless local area network employs an infrared wireless communication protocol and wherein the wireless communication receiving units comprise infrared enabled handheld electronic information devices.

50. The method of claim 30 further comprising the step of providing a means for preventing cross talk between the plurality of wireless communication sending units.

51. The method of claim 50 wherein each wireless sending unit emits periodic signals with at least one wait time and wherein the means for preventing cross talk between the plurality of wireless communication sending units comprises a means for individually varying the wait time for each wireless communication sending unit.

52. The method of claim 51 wherein each periodic signal comprises at least one transmission of an identification number for each wireless communication sending unit and wherein the means for individually varying the wait time comprises a means for generating a random wait time based on a mathematical calculation involving the identification number of the individual wireless communication sending unit.

53. The method of claim 52 wherein each periodic signal emitted from each wireless communication sending unit comprises an emitting of the identification number for the wireless communication sending unit a plurality of times with each emitting of the identification number separated by a between-number wait time and with each periodic signal separated by a between-signal wait time.

54. The method of claim 52 wherein the identification number for each wireless communication sending unit is formed by a plurality of bytes and wherein the mathematical equation involving the identification number involves a successive multiplication of the bytes forming the identification number.

55. The method of claim 54 wherein each wait time is within a range of legal wait times with a minimum wait time and a maximum wait time separated by a number of units and wherein the mathematical equation comprises multiplying successive bytes of each identification number and determining a modulo of that number until all bytes are used to produce a product, then dividing the product by that modulo to produce a result and multiplying the result by the number of units in the range of legal wait times, and then adding the minimum wait time thereto to produce the wait time.

56. The method of claim 55 wherein each periodic signal emitted from each wireless communication sending unit comprises an emitting of the identification number for the wireless communication sending unit a plurality of times with each emitting of the identification number separated by a between-number wait time and with each periodic signal separated by a between-signal wait time.

57. The method of claim 56 wherein each wireless communication sending unit has a plurality of infrared LEDs and wherein each periodic signal comprises an emitting of the identification number by each of the plurality of infrared LEDs in succession.

58. The method of claim 30 further comprising the step of providing a means for enabling a recording to the central server of information relating to a person retaining a wireless communication sending unit by a person retaining a wireless communication receiving unit.

59. The method of claim 30 further comprising the step of providing a means for providing a scoring of levels of correlation between parameters established by a person retaining a wireless communication receiving unit and characteristics of a person retaining a wireless communication sending unit.

60. The method of claim 59 wherein the means for providing a scoring of levels of correlation between parameters established by a person retaining a wireless communication receiving unit and characteristics of a body retaining a wireless communication sending unit comprises a means for enabling a scoring of levels of correlation relative to different classes of bodies retaining wireless communication sending units employing at least one different parameter for each class of bodies.

61. A system for wireless information retrieval regarding mobile bodies and for disseminating content based on retrieved information, the system comprising:

a wireless communication sending unit for being retained relative to a first mobile body wherein the wireless communication sending unit comprises a means for emitting a periodic identifying signal;

a wireless communication receiving unit for being retained relative to a second mobile body wherein the wireless communication receiving unit comprises a means for receiving the signal emitted by the wireless communication sending unit;

a central server for retaining information wherein the central server retains information regarding the first mobile body and an identifying association between the wireless communication sending unit and the first mobile body;

a wireless access point; and wherein the wireless communication sending unit, the wireless communication receiving unit, the central server, and the wireless access point cooperate to form a wireless local area network arrangement;

wherein the wireless communication receiving unit has a display screen for enabling a display of transmitted information regarding the first mobile body;

means for transmitting information regarding the first mobile body retaining the wireless communication sending unit to the wireless communication receiving unit in response to a receipt of a signal from the wireless communication sending unit retained by the first mobile body by the wireless communication receiving unit; and means for displaying information received regarding the first mobile body retaining the wireless communication sending unit on the display screen of the wireless communication receiving unit.

62. The system of claim 61 wherein the wireless local area network employs an infrared wireless communication protocol and wherein the wireless communication receiving unit comprises an infrared enabled handheld electronic information device.

63. The system of claim 61 wherein the central server retains a history of signals received by the wireless communication receiving unit from the wireless communication sending unit and of information transmitted to the wireless communication receiving unit in response to the receipt of signals from the wireless communication sending unit.

64. The system of claim 61 wherein there are a plurality of wireless communication sending units, each wireless communication sending unit for being retained relative to a different mobile body.

65. The system of claim 64 further comprising a means for preventing cross talk between the plurality of wireless communication sending units.

66. The system of claim 65 wherein the periodic signals emitted by each wireless communication sending unit have at least one wait time and wherein the means for preventing cross talk between the plurality of wireless communication sending units comprises a means for individually varying the wait time for each wireless communication sending unit.

67. The system of claim 66 wherein each periodic signal comprises at least one transmission of an identification number for each wireless communication sending unit and wherein the means for selectively varying the wait time comprises a means for generating a random wait time based on a mathematical calculation involving the identification number of the wireless communication sending unit.

68. The system of claim 67 wherein each periodic signal emitted from each wireless communication sending unit comprises an emitting of the identification number for the wireless communication sending unit a plurality of times with each emitting of the identification number separated by a between-number wait time and with each periodic signal separated by a between-signal wait time.

69. The system of claim 67 wherein the identification number for each wireless communication sending unit is formed by a plurality of bytes and wherein the mathematical equation involving the identification number involves a successive multiplication of the bytes forming the identification number.

70. The system of claim 69 wherein each wait time is within a range of legal wait times with a minimum wait time and a maximum wait time separated by a number of units and wherein the mathematical equation comprises multiplying successive bytes of each identification number and determining a modulo of that number until all bytes are used to produce a product, then dividing the product by that modulo to produce a result and multiplying the result by the number of units in the range of legal wait times, and then adding the minimum wait time thereto to produce the wait time.

71. The system of claim 70 wherein each periodic signal emitted from each wireless communication sending unit comprises an emitting of the identification number for the wireless communication sending unit a plurality of times with each emitting of the identification number separated by a between-number wait time and with each periodic signal separated by a between-signal wait time.

72. The system of claim 71 wherein each wireless communication sending unit has a plurality of infrared LEDs and wherein each periodic signal comprises an emitting of the identification number by each of the plurality of infrared LEDs in succession.

73. The system of claim 61 further comprising a means for initiating an automatic request for additional information regarding the first mobile body based on a predetermined condition.

74. The system of claim 73 wherein the means for initiating an automatic request for additional information regarding the first mobile body comprises a means for initiating an automatic request based on a receipt of periodic signals from the wireless communications sending unit for a continuous predetermined time.

75. The system of claim 73 further comprising a means for determining when the wireless communication sending unit has come within a predetermined approximate range of the wireless communication receiving unit and wherein the means for initiating an automatic request for additional information regarding the first mobile body comprises a means for initiating an automatic request based on the wireless communication sending unit coming within the predetermined approximate range of the wireless communication receiving unit.

76. The system of claim 75 wherein the means for emitting a periodic signal from the wireless communication sending unit comprises a means for emitting a first periodic signal over a first distance range and a second periodic signal over a second distance range wherein the second distance range is smaller than the first distance range and wherein the automatic request is initiated in response to a receipt of the second periodic signal by the wireless communication receiving unit.

77. The system of claim 61 further comprising a stationary wireless communication receiving unit for being disposed in a stationary location and for receiving a signal from the wireless communication sending unit by the stationary wireless communication receiving unit when the wireless communication sending unit is in a given proximity to the stationary wireless communication receiving unit thereby enabling a determination of whether the wireless communication sending unit is in the given proximity with the stationary wireless communication receiving unit and, therefore, an approximate location of the wireless communication sending unit.

78. The system of claim 61 further comprising a continuously operable wireless communication receiving means disparate from the wireless communication receiving unit for ensuring a continuous receipt of signals from the wireless communication sending unit.

79. The system of claim 61 further comprising a triangulation server with a means for querying the wireless access point as to a relative signal strength of the wireless communication sending unit to enable an estimate of the location of the wireless communication sending unit.

80. The system of claim 79 further comprising a means for testing signal strengths received by the triangulation server based on relative locations of wireless communication sending units and for comparing test signal strengths for known locations relative to received signal strengths for unknown locations to approximate unknown locations of wireless communication sending units.

81. The system of claim 61 further comprising a means for enabling an ignoring by the wireless communication receiving unit of signals received from a selected wireless communication sending unit.

82. The system of claim 61 further comprising a means for inducing an alert relative to the wireless communication receiving unit in response to a receipt of a signal from a selected wireless communication sending unit.

83. The system of claim 61 further comprising a means for providing a scoring of levels of correlation between parameters established by a person retaining a wireless communication receiving unit and characteristics of a body retaining a wireless communication sending unit.

84. The system of claim 83 wherein the means for providing a scoring of levels of correlation between parameters established by a person retaining a wireless communication receiving unit and characteristics of a body retaining a wireless communication sending unit comprises a means for enabling a scoring of levels of correlation relative to different classes of bodies retaining wireless communication sending units employing at least one different parameter for each class of bodies.

85. The system of claim 61 further comprising a means for enabling a selective review of information relating to signals received by the wireless communication receiving unit and of information transmitted to the wireless communication receiving unit in response to the receipt of signals from the wireless communication sending unit.

86. The system of claim 61 further comprising the step of providing a means for enabling Internet access to details regarding the history of signals received by the wireless communication receiving unit from the wireless communication sending unit and of information transmitted to the wireless communication receiving unit in response to the receipt of signals from the wireless communication sending unit.

87. The system of claim 61 further comprising a means for enabling varied levels of access to information based on user-specific authorizations.

* * * * *